US008274506B1

(12) United States Patent
Rees

(10) Patent No.: US 8,274,506 B1
(45) Date of Patent: Sep. 25, 2012

(54) SYSTEM AND METHODS FOR CREATING A THREE-DIMENSIONAL VIEW OF A TWO-DIMENSIONAL MAP

(75) Inventor: David B T Rees, Palo Alto, CA (US)

(73) Assignee: Adobe Systems Incorporated, San Jose, CA (US)

( * ) Notice: Subject to any disclaimer, the term of this patent is extended or adjusted under 35 U.S.C. 154(b) by 949 days.

(21) Appl. No.: 12/111,031

(22) Filed: Apr. 28, 2008

(51) Int. Cl.
*G06T 15/00* (2011.01)
*G06F 3/00* (2006.01)

(52) U.S. Cl. ........................................ 345/419; 715/700
(58) Field of Classification Search .................. 345/419; 715/700
See application file for complete search history.

(56) References Cited

U.S. PATENT DOCUMENTS

| | | | | |
|---|---|---|---|---|
| 6,111,583 | A * | 8/2000 | Yaron et al. ..................... | 345/421 |
| 6,202,026 | B1 * | 3/2001 | Nimura et al. .................. | 701/211 |
| 6,222,557 | B1 * | 4/2001 | Pulley et al. .................... | 345/622 |
| 6,229,546 | B1 * | 5/2001 | Lancaster et al. ............... | 345/419 |
| 6,247,019 | B1 * | 6/2001 | Davies ............................ | 1/1 |
| 6,985,929 | B1 * | 1/2006 | Wilson et al. ................... | 709/217 |
| 7,177,761 | B2 * | 2/2007 | Kaufman et al. ............... | 701/211 |
| 7,353,114 | B1 * | 4/2008 | Rohlf et al. ...................... | 702/5 |
| 7,746,343 | B1 * | 6/2010 | Charaniya et al. .............. | 345/428 |
| 2002/0042819 | A1 | 4/2002 | Reichert et al. | |
| 2002/0120395 | A1 | 8/2002 | Smith | |
| 2002/0123841 | A1 * | 9/2002 | Satoh et al. ..................... | 701/208 |
| 2004/0054475 | A1 * | 3/2004 | Grace ............................... | 702/1 |
| 2004/0161131 | A1 | 8/2004 | Rhoads | |
| 2005/0034062 | A1 | 2/2005 | Bufkin et al. | |
| 2005/0270288 | A1 | 12/2005 | Arcas | |
| 2005/0276440 | A1 | 12/2005 | Rhoads et al. | |
| 2007/0104378 | A1 | 5/2007 | Aguera Y Arcas | |
| 2007/0116325 | A1 | 5/2007 | Rhoads et al. | |
| 2007/0257903 | A1 * | 11/2007 | Gutierrez et al. ............... | 345/419 |
| 2008/0016472 | A1 | 1/2008 | Rohlf et al. | |
| 2008/0152216 | A1 * | 6/2008 | Meadow et al. ................ | 382/154 |
| 2008/0189249 | A1 * | 8/2008 | Petakov et al. ................. | 707/3 |
| 2010/0013831 | A1 * | 1/2010 | Gilje et al. ...................... | 345/419 |

* cited by examiner

*Primary Examiner* — David T Welch
(74) *Attorney, Agent, or Firm* — Robert C. Kowert; Meyertons, Hood, Kivlin, Kowert & Goetzel, P.C.

(57) ABSTRACT

Systems, methods, and computer-readable storage media for generating 3D views of 2D images are disclosed. Image data representing a 2D map may be included in an input document in a portable document format, along with embedded geospatial information related to the map. A document-based 3D translator may extract image data and other information from the input document and may translate the image into a map projected on a 3D model of the Earth's surface, using embedded location and/or extent information. Additional information may be projected on the map image or displayed as a height, texture, or color, or as separate, anchored, or floating text. Image data representing the 3D view may be output to the same or a different document file. The methods may be implemented in a system comprising a CPU and/or a GPU, and/or as program instructions, stored on computer-readable media, executable by the CPU and/or GPU.

43 Claims, 11 Drawing Sheets

SYSTEM AND METHODS FOR CREATING A THREE-DIMENSIONAL VIEW OF A TWO-DIMENSIONAL MAP

BACKGROUND

1. Field of the Invention

The present invention is directed to computer systems; and more particularly, it is directed to the compositing and rendering of three-dimensional images from two-dimensional maps using computer systems.

2. Description of the Related Art

As the power and complexity of personal computer systems increase, graphics operations are increasingly being performed on these systems, often making use of dedicated graphics rendering devices referred to as graphics processing units (GPUs). As used herein, the terms "graphics processing unit" and "graphics processor" are used interchangeably. Although GPUs vary in their capabilities, they may typically be used to perform such tasks as rendering of two-dimensional (2D) graphical data, rendering of three-dimensional (3D) graphical data, accelerated rendering of graphical user interface (GUI) display elements, and digital video playback. A GPU may include various built-in and configurable structures for rendering digital images to an imaging device.

Digital images may include raster graphics, vector graphics, or a combination thereof. Raster graphics data (also referred to herein as bitmaps) may be stored and manipulated as a grid of individual picture elements called pixels. A bitmap may be characterized by its width and height in pixels and also by the number of bits per pixel. Commonly, a color bitmap defined in the RGB (red, green blue) color space may comprise between one and eight bits per pixel for each of the red, green, and blue channels. An alpha channel may be used to store additional data such as per-pixel transparency values.

Vector graphics data may be stored and manipulated as one or more geometric objects built with geometric primitives. The geometric primitives (e.g., points, lines, polygons, curves, and text characters) may be based upon mathematical equations to represent parts of vector graphics data in digital images. The geometric objects may typically be located in two-dimensional or three-dimensional space. To render vector graphics on raster-based imaging devices (e.g., most display devices and printers), the geometric objects are typically converted to raster graphics data in a process called rasterization.

Graphical data may often be expressed in a structured format that complies with a particular specification or model for representing such data. Instead of requiring application programs to describe every page as a full-resolution pixel array, a high-level imaging model may enable applications to describe the appearance of pages containing text, graphical shapes, and sampled images in terms of abstract graphical elements rather than directly in terms of device pixels. Such specifications and models may often be implemented across multiple computing platforms to facilitate the exchange of graphical data. The Adobe® PostScript® language, Adobe® Portable Document Format (PDF), and Adobe® Imaging Model, for example, include various structures and commands to describe complex two-dimensional graphical data including geometric models and bitmapped images.

Two-dimensional projection of graphical images, such as maps, tends to distort some data, making it harder to compare relative sizes or distances. For example, a Mercator projection is a very common 2D map projection, but it tends to make European and North American countries look much larger then their true size. In addition, some projections may not handle adjacent maps correctly, as distortion or error gradually creeps in. Therefore, 2D maps can be hard to view next to each other. Furthermore, local governments, planning commissions, public outreach, defense-related organizations, and other users may wish to view geospatial data in three dimensions. For example, this may become important for viewing data in context (e.g., as it would appear on the Earth's surface), or for more easily interpreting height data (e.g., 3D/height data may be important for evaluating line of sight, in some applications). However, true 3D map data is not typically available in a format that is compatible with document-based applications.

SUMMARY

Various embodiments of systems, methods, and computer-readable storage media for rendering true three-dimensional (3D) views of two-dimensional (2D) maps are disclosed. In some embodiments, the methods described herein for rendering such 3D views may include importing a document that includes a 2D image containing a geospatial feature, extracting that image from the document, and translating that image into 3D data in an output document. As used herein, a geospatial feature is one that relates data to a position on the surface of a planet or other celestial body (e.g., the Earth). The input document, which may be a document in a portable document format (e.g., Adobe® PDF, or the XML Paper Specification, XPS, developed by Microsoft), may include other data related to the image, which may be expressed in a geospatial data format, or as non-geospatial information. This information may also be extracted from the input document by the 3D translator and may be used to modify and/or annotate the 3D output image. In some embodiments, the data contained in the input document may be supplemented by additional geospatial and/or non-geospatial data (e.g., data input by a user or extracted from a library, database, or other data store), which may be used by the 3D translator to further modify and/or annotate the 3D output image. Note that while various input and output files are described herein as being PDF files, in some embodiments, the 3D translator may also support other portable document formats (e.g., XPS) for these files.

Various geospatial data formats may be supported, in different embodiments. In some embodiments, a simple form of geospatial reference may be provided within the output 3D data, such that a measurement function may display latitude and/or longitude coordinates for a point position and may compute and/or display a distance between two points in the geospatially aware 3D data. In one example, a 3D view may be created from a 2D map stored in a GeoTIFF image (e.g., one formatted in accordance with GeoTiff Revision 1.8.2, 10 Nov. 1995, or any other compatible version) having additional embedded geospatial information. GeoTIFF is a metadata standard that allows embedding of geo-referencing information in a file formatted using the Tagged Image File Format (TIFF). In this example, the GeoTIFF image may include a JPEG image of a map, along with embedded location information and/or and data indicating the extent of the image on the Earth. The system and methods described herein may in some embodiments be used to convert the image to a 2D document in a portable document format (PDF) that includes the geospatial information. The system and methods described herein may then be used to convert the JPEG image in the 2D PDF file to a 3D model including Earth curvature via a World Geodetic System projection (e.g., a WGS84 projection). In the 3D model, the 2D image may appear at a given latitude and longitude extent, draped over a spheroid the size of the Earth. This 3D model may then be saved to an output PDF file. In some embodiments, the 3D data in the output PDF file may be viewed as any other 3D file by the system, and the system may support markup and measurement of the 3D data during viewing. For example, the 3D translator may be implemented as a feature of a document authoring application and other standard features of the document authoring application may be applied to the generated 3D data while it exists in the framework during (or immediately following) translation and/or after it is saved in an output document. In some embodiments a fly tool of the 3D translator may facilitate fly-by and/or fly-through simulations of the 3D view. A similar workflow may be applied to other file and/or data formats supported by the system.

The methods described herein for translating 2D maps to 3D views may be implemented in a system comprising a CPU and/or a GPU, and/or as program instructions, stored on computer-readable media, executable by the CPU and/or GPU in such a system to implement a 3D translator.

Figure 1:
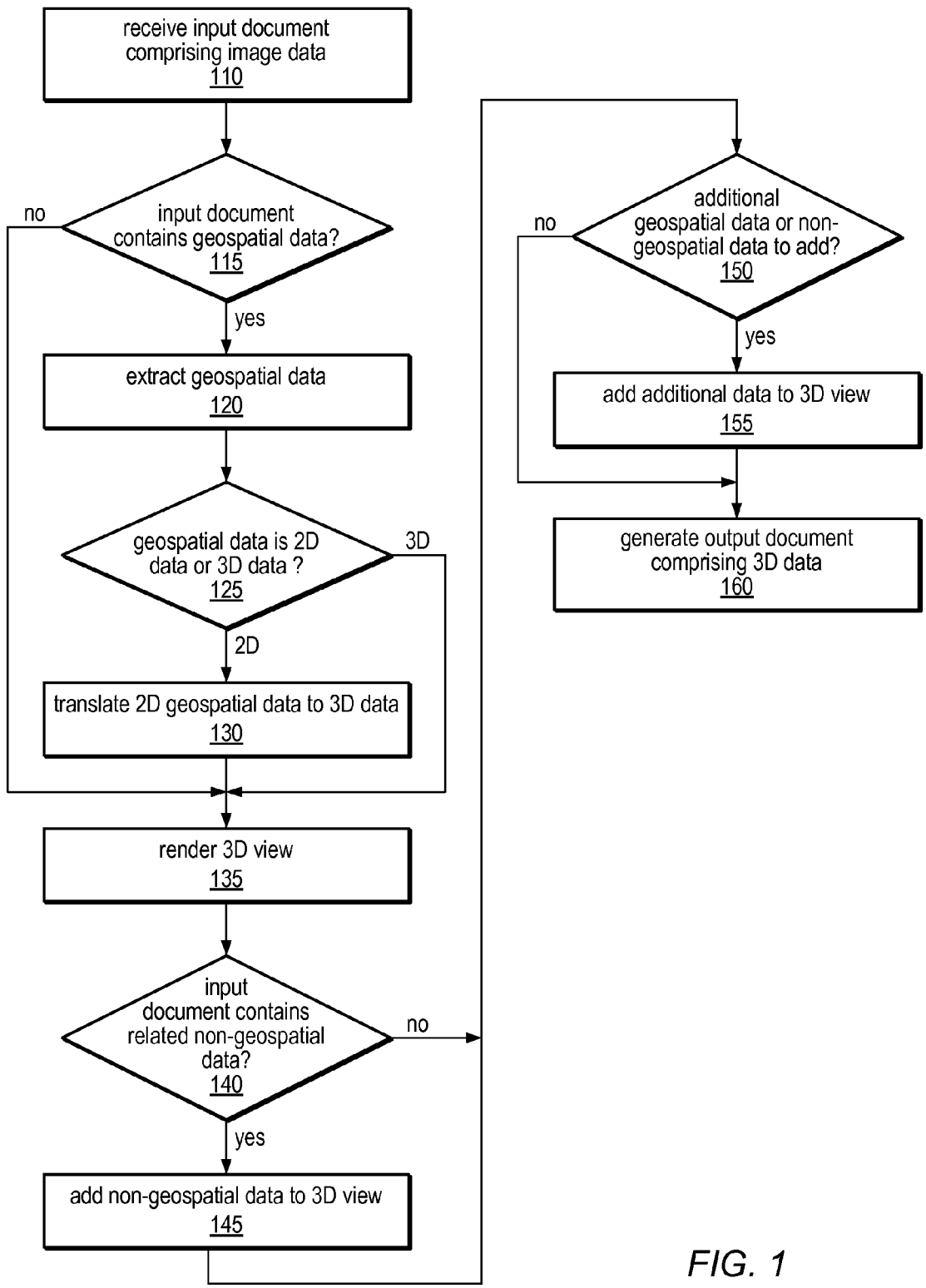
FIG. 1 illustrates a method for creating a 3D view of a 2D map, according to one embodiment.

While the invention is susceptible to various modifications and alternative forms, specific embodiments are shown by way of example in the drawings and are herein described in detail. It should be understood, however, that drawings and detailed description thereto are not intended to limit the invention to the particular form disclosed, but on the contrary, the invention is to cover all modifications, equivalents and alternatives falling within the spirit and scope of the present invention as defined by the appended claims.

DETAILED DESCRIPTION OF EMBODIMENTS

Various embodiments of systems and methods for rendering three-dimensional (3D) views of a two-dimensional (2D) image (e.g., a map) are disclosed. In some embodiments, the system may receive a document containing 2D image data (e.g., data representing a flat map) and may convert the image into a 3D rendering of the image as projected upon the surface of the Earth (or another celestial body). In other words, a 3D translator, as described herein, may take a document in a portable document format (e.g., PDF) as its input, and for each page in the document, may determine whether a geospatial feature (e.g., a map) is included on the page. If so, the document-based 3D translator may draw each element of the page (or each element of a map included in the page) as projected on the Earth. In some embodiments, the input document may include the location, the extent of the map area on Earth, and/or the projection of the map, embedded as geospatial information in the document. In such embodiments, the system may use this information in recreating the map in 3D. For example, the 3D translator may determine the coordinates of the map area at sea level upon the Earth, and use this in projecting the map on the Earth in its place.

Mapping agencies (e.g., national and local government planners) may present 3D data to the public, referencing the impact of a development, as can architects and other planners. These mapping agencies typically present the 3D data as map symbols on a 2D projection of a map. However, 3D views may be much more easily understood by the public compared to map symbols, as they more closely represent the actual views of the development that the public would experience. Some graphical design platforms directed to architectural applications include integrated 3D geospatial information, allowing buildings to be viewed in local context. However, these platforms may not able to mix 3D terrain and heights with real 3D geospatially located buildings, which would permit much easier reading by both the public and professionals. The systems and methods disclosed herein for converting 2D maps to 3D views may in some embodiments allow visual inspection of true relative sizes and locations. In addition, such true 3D projection may avoid problems common with viewing adjacent maps using 2D projections (such as distortion or creeping error).

Note that, in some embodiments, 2D geospatial functionality (e.g., 2D projections) and 3D geospatial functionality (as described herein) may be considered complementary technologies. In some cases, a 2D projection may provide a more familiar and standardized way for a professional to convey information to another professional. For example, symbology has evolved such that it may be used to convey complex relationships, such as the simultaneous viewing of gas, electrical and road networks for a development. In some embodiments, 3D geospatial functionality (including 3D translation of 2D maps) may be complementary to this, such as for presenting information to the general public. This 3D functionality may give the user the ability to interact and see more data in a more realistic way. For example, rather than reading contour lines on a map and imagining the slopes and valleys, a user could actually see those terrain shapes, roughly as they would really appear. For a novice, this means map information may be more accessible, as the user can more easily visualize the area represented by the map instead of interpreting symbols. For the expert, dealing with large amounts of complex data, if some data is represented in true 3D, more mental effort may be expended on the remaining symbolic data. Thus, 3D functionality may complement rather than replace 2D functionality, in some applications. The system and methods disclosed herein may in some embodiments allow both 2D projections and 3D views to exist simultaneously in the same document. For example, geospatial and/or non-geospatial information that may be meaningful to a 3D document application (e.g., to the 3D translator) may be included in input and/or output documents in constructs that augment the standard document format. In such embodiments, this information may be ignored (e.g., it may not be displayed) by a 2D document application, but may be displayed and/or interpreted when associated images are viewed by a 3D document application (including a 3D translator).

In some embodiments, the system may include program instructions executable to implement 2D geospatial functionality that may convert 2D files to an internal document and, rather than saving the internal document to PDF, may parse the internal document to extract and/or create data representing a 3D view of a geospatial feature. In some embodiments, the extracted and/or created 3D data may be passed to other program instructions executable to implement 3D geospatial functionality to create a 3D scene that includes the geospatial feature. In some embodiments, the system may include program instructions executable to implement an interface by which 3D data is saved in the PRC format, described later. In various embodiments, any or all of these program instructions may be considered a component of a 3D translator. In other embodiments, a system and method for creating 3D views of 2D maps (e.g., a 3D translator) may include only an authoring portion, e.g., program instructions and/or hardware support for creating the 3D views and outputting a PDF file containing those 3D views. Note that while the examples described herein primarily involve the translation of 2D maps onto the Earth's surface, the system and methods may in some embodiments be more generally applicable to translation of 2D data representing any image elements to a corresponding 3D view. For example, they may be used to render a 3D view in which one or more 2D image elements other than map elements are wrapped around another type of object and/or surface (e.g., an architectural model or a model used in a manufacturing context).

In some embodiments, a 3D translator implemented in a document authoring application may leverage existing 3D features of the application toward geo-navigation. For example, some document applications may support multiple views and camera animation for 3D views, and they may allow markups and/or commenting of 3D views. In some embodiments, extensions to one or more components of a document application may be made to support customers interested in manipulation of geospatial information within documents. For example, in some embodiments, measurement and/or 3D data navigation features may be extended to support 3D views created from 2D maps by the 3D translator. In other embodiments, the system and/or the 3D translator, may include other features, including, but not limited to, playback and sophisticated fly tool navigation features that may be applied to these 3D views. In various embodiments, the system and methods described herein may be compatible with different document authoring applications and formats and/or with different versions of those applications and format. For example, the methods may interface with, or be integrated within, different versions of Adobe Acrobat® (e.g., Acrobat® Reader®, Acrobat® Standard, Acrobat® Pro, and Acrobat® Pro Extended), or may interface with, or be integrated within another commercial or proprietary application usable to create, modify, and/or manage documents. As used herein, the terms "document authoring application" and "document application" may refer to any of a variety of such applications, and may be used interchangeably. Note also that in various embodiments, the system and methods described herein may be suitable for application on different computing platforms, including those based on MAC OS® or the Windows® operating system, and/or any other suitable platform used in personal, scientific, technical, or industrial computing settings.

A method for creating a 3D view of a 2D map, according to one embodiment, is illustrated in FIG. 1. In this example, the system may receive an input document that includes image data, as in 110. For example, the system may receive a 2D PDF document comprising one or more images, such as one or more maps. In various embodiments, the 3D translator may receive the 2D PDF file as a standalone file or may access it while it is resident in memory (e.g., within the framework of the document authoring application) from a previous operation, such as immediately after creation of a 2D PDF through conversion from a document of another file type. For example, in some embodiments, an input 2D PDF document may have been created by 2D geospatial functionality included in the system (e.g., as a feature of the document authoring application). In one embodiment, a 2D Geographic Information Systems (GIS) feature of Acrobat® may be used to convert 2D geospatial content in a non-native format to a PDF file, where it may be viewed as a flat map. For example, a JPEG file stored in a GeoTIFF image with additional embedded geospatial information (e.g., its location and extent on the Earth) may be converted to a 2D PDF with geospatial information by the system prior to the operation illustrated as 110 of FIG. 1. In one embodiment that includes a graphical user interface, the user may "drag" the JPEG file into (or over) an icon representing a 2D PDF writer, and the 2D PDF writer may convert the JPEG file to a PDF file. Note that in other embodiments, other formats may be supported by the 2D geospatial functionality and/or the 3D geospatial functionality (e.g., the 3D translator) of the system. In other words, the 3D translator may receive input data representing one or more image elements as a file in any one of various formats, including a file in an image format and/or a file in a portable document format. In some embodiments, a file in an image format (e.g., a JPEG file) may be input to the 3D translator by being dragged over an icon representing the 3D translator, and the image may be translated into a 3D view without first being converted to a 2D PDF file by a separate operation. In such embodiments, a conversion to the intermediate file format may not be performed, or may be performed without the knowledge and/or intervention of the user.

Note that, as previously described, a document-based 3D translator may examine one page of an input document at a time to identify and extract image data representing maps and any associated geospatial and/or non-geospatial information associated with those maps. In such embodiments, the operations illustrated in FIG. 1 may be repeated for each page of an input document and/or for each map image found in and extracted from such a document. Also note that the method illustrated in FIG. 1 may in some embodiments be applied iteratively, such that an output document previously created by the 3D translation method (and including a 3D view of a map generated by the system) may be input for further processing by the system. For example, after converting a 2D map to a 3D view in one pass, additional geospatial or non-geospatial data may be added to the 3D view and/or other operations may be performed on the 3D view (e.g., measurement, fly-by and/or fly-through simulation, etc.) In another example, after generating a 3D view of a map found on one page of an input document and writing the corresponding 3D data to an output file, additional passes may be used to extract and translate additional maps found in the input file and to add the corresponding 3D data to the output file. The output document may be populated by outputting data corresponding to two or more 3D images/views to a same page of the output document (e.g., as multiple maps projected on the same 3D model of the Earth), or by populating separate pages for each respective input page, in different embodiments. In yet another example, the 3D translator may be configured to aggregate multiple 3D views into a single output document (or image thereof), taking 2D images and/or 3D images as input to the aggregation process and translating any images that are not formatted for display and/or storage by the 3D translator. In such embodiments, the 3D translator may be configured to overlay images from one input file (e.g., images of building or geographic features that may be stored in a database or library) onto a 3D view of a translated 2D map.

As illustrated in FIG. 1, the method may include determining if the input document includes geospatial data, as in 115. If so, shown as the positive exit from 115, the method may include extracting the geospatial data, as in 120. For example, the input document may include an image of one or more geospatial features (e.g., maps) and may also include geospatial data, such as the location of the mapped feature on the Earth (or on some other celestial body, e.g., the Moon, or another planet) and/or the projection of the map. In some embodiments, such information may be used by the 3D translator to determine the coordinates at sea level upon the Earth (or some other celestial body) when recreating the map in a 3D view, as described below. In another example, an input document may include maps targeted to multiple celestial bodies (e.g., to multiple planets and/or moons in a solar system), and the 3D translator may generate an output file that includes data representing one 3D view that includes all of these maps, projected on their respective celestial bodies, or that includes separate 3D views and/or pages for each image and/or for each group of images (e.g., where the images are grouped so that they are projected on the appropriate celestial body).

If the input document includes geospatial data, the method may include determining if the geospatial data includes 2D data or 3D data, as in 125. If the input document includes 2D data, shown as the "2D" exit from decision block 125, the method may include translating the 2D geospatial data to 3D data, as in 130. For example, 2D image data (e.g., data representing a flat map), included in the input document, may be converted into data usable by the 3D translator in rendering a 3D view of the map. In another example, location, extent, and/or projection information associated with (and/or embedded within) 2D image data may be converted into data usable by the 3D translator in rendering the 3D view of the map.

If the input document includes 3D geospatial data, shown as the "3D" exit from decision block 125, the method may include the 3D translator using this data directly in rendering the 3D view of the map. For example, the input document may have been created as an output of the method illustrated in FIG. 1, as described above. In this case, the input document may already include 3D geospatial data usable in rendering one or more 3D views of a map. Note also that in some embodiments, an input document may include both 2D and 3D geospatial data, and may be operated on by both 2D geospatial functionality and 3D geospatial functionality for different purposes and/or audiences, as described above.

In the example illustrated in FIG. 1, the method may include rendering a 3D image (e.g., a 3D view of the input map), as in 135. In this example, the 3D translator may create and render this view dependent on 2D geospatial data and/or 3D geospatial data embedded in the input document and/or on other geospatial data associated with input images. For example, a flat map included in the input document may be rendered in 3D as a 2D image draped over a spheroid representing the Earth and placed on the spheroid according to a given latitude and longitude extent specified by geospatial data embedded in the input document (e.g., embedded in a 2D PDF document). If the input document does not include any geospatial information, shown as the negative exit from 115, the 3D translator may in some embodiment be configured to render a 3D image anyway. For example, in some embodiments, a user may invoke a 3D translation function for a 2D image that does not include embedded geospatial information and may input (e.g., through a GUI) location, extent, projection, and/or other geospatial information to be used in rendering a 3D view of the image. In another example, a 3D translation of an image that does not include embedded geospatial information may be based on default geospatial information. For example, the 3D translator may be configured to render a 3D view of any image that does not include specified location, extent, and/or height information as the input 2D image draped over a spheroid of sufficient size to display the entire input image, with the 2D image centered vertically between the "Poles" of the spheroid at a (defined) arbitrary "longitude." In yet another example, data representing a 2D image (e.g., a flat map, with or without additional text or other information) may not be represented by image data, per se, but may be represented within an input file as one or more sets of vector data, and this vector data may be translated into data usable for rendering a 3D view of the map.

In the example illustrated in FIG. 1, the method may include determining if the input document includes any non-geospatial data (or non-visual data) associated with the input map, as in 140. For example, geospatial data associated with an input image may include height data. The height data may be embedded in the input document or may be stored as potentially accurate values that are distinct from the visual representation of the 2D PDF page, in different embodiments. In one embodiment, data representing one or more locations (e.g., on the Earth) may be stored along with respective altitudes in location value sets (e.g., within the input document, in this example). In this example, one location value set may store data representing 30 degrees latitude, 90 degrees longitude, and an altitude of 100 m. This height data may be translated by the 3D translator to obtain height data for the 3D view of the map that is to be created. This height data may in various embodiments be associated with geographic features within the mapped area (e.g., hills, valleys, etc.), or with man-made structures within the mapped area (e.g., buildings, bridges, etc.) In some embodiments, any other type of location-based data (e.g., population data or other numerical and/or statistical information, text descriptions, labels, names, etc.) may be embedded in the input document and extracted for use in rendering a 3D view of the map. For example, a location value set may store data representing 30 degrees latitude, 90 degrees longitude, and a population density of 1000 people per square mile. Note that non-geospatial and/or non-visual data embedded in an input document be associated with a given page in the input document, in some embodiments. In other embodiments, it may be related to one or more specific geospatial features (e.g., a given map or portion thereof, or multiple related maps) included in the input document.

As illustrated in FIG. 1, if non-geospatial and/or non-visual information is embedded in the input document, shown as the positive exit from decision block 140, it may be consumed by the 3D translator when creating the 3D view of the map and/or may be added to the 3D view, as previously rendered. This is shown as 145. For example, height data, population data, or any other location-related value may be used to modify the 3D view to perturb the point upon the Earth's surface derived from latitude, longitude, and 2D map projection. In other words, without perturbation, the resulting image in 3D may be a smooth ellipsoid. However, with perturbation, the resulting image may include a bumpy surface, where the bumpiness is correlated with the magnitude and sign of the non-geospatial 2D data. For example, if height data (or another kind of offset data) is included, then a greater height may create a greater perturbation away from the surface, in the 3D view. In other embodiments, non-geospatial and/or non-visual 2D data may be used to modify the appearance of the 3D view in some other way, such as by modifying a color or texture of a corresponding portion of the 3D view, or by adding text to the 3D view of the map, instead of, or in addition to, such height perturbation.

In some embodiments, rather than perturbing the 3D view itself (e.g., by modifying the appearance of the 3D view of the map and/or the appearance of the surface on which it is wrapped), adding non-geospatial data to the 3D view may involve the addition of anchored or floating (e.g., "pop-up") text to the 3D view. For example, a text label may be added to the 3D view that points to a portion or feature of the map and that calls out data associated with that portion or feature of the map. In another example, a legend may be added to the 3D view, but it may not point to any portion of the map, being associated with the entire map, rather than a portion thereof. In an embodiment that includes a GUI, a user may be able to manipulate a cursor (e.g., using a mouse) over the map, and any values (for geospatial data and/or non-geospatial data) associated with the location of the cursor (or associated with a location near the cursor) may be displayed in a dialog box (e.g., a pop-up box overlaying the 3D map). For example, as the cursor passes over two or more locations on the map, respective population or height data may be displayed for each location, which may be captured by the user and manipulated, either automatically or manually. In some embodiments, such a feature may be used for gathering data for a measurement involving the map.

Note that in some embodiments, the modifications and/or perturbations described above regarding the 3D view may also be applied to a 2D view of the map. In other words, such non-visual data may be associated with an input 2D map and may be used for measurement or to derive a visual appearance for the 3D view and/or for the 2D image, as well. For example, the 2D geospatial functionality may use the same (or similar) non-visual 2D data information to color or otherwise modify the appearance of the 2D map based on the non-visual 2D data.

In the example illustrated in FIG. 1, the method may include determining if additional geospatial or non-geospatial data (e.g., from sources other than the input document itself) are available to add to the 3D view, as in 150. For example, in some embodiments, the 3D functionality may consult a library of GIS data to obtain information related to the input map and may add this information to the 3D view of that map, as in 155. For example, rather than being embedded in the input document, height data, population data, or any other location-related data (e.g., other statistical data or text-based information associated with a given location) may be extracted from such a library and added in the same manner as the information embedded in the input document, as described above. In one embodiment, a function accessible through a GUI may allow the importing of such a library, or a portion thereof, and the 3D functionality may be configured to import data associated with the latitude and longitude extent of the map, mapping the data into location value sets, such as those described above. In some embodiments, a user may be able to import or otherwise add such data to a 3D view through a graphical user interface. For example, the user may be able to use a mouse to point a cursor at a given location on the 3D view and may enter or import data related to that location through the GUI. In some embodiments, a user may add one or more markup language statements to a 3D view using such a GUI. For example, a user may use a function of the GUI to add a virtual "sticky note" to an image to indicate an error, a question, or a comment, such as, "this is wrong", and that virtual sticky note may be visible in the 3D view by other users who view the output document. Such a sticky note may be projected on the surface along with the 3D view (e.g., as draped on the Earth), or may be displayed as separate, anchored, or floating (pop-up) text, in various embodiments. In yet another example, non-geospatial information that may be added to a 3D view may include an audio file or a video file, which may be displayed as a separate, anchored, or floating movie, "talking head", etc.

In the example illustrated in FIG. 1, once all the desired geospatial and/or non-geospatial data has been added to the rendered 3D view, the system may generate an output document comprising data representing the 3D view, as in 160. As described above, this output document may in some embodiments be a PDF file, and may include data corresponding to both 2D and 3D representations of any or all images included in the original input document, or only a 3D representation. In some embodiments, different document authoring applications (or versions thereof) may be configured to render a two-dimensional view of the input image elements, a three-dimensional view of the input image elements, or both, using the data in the output document. In one embodiment, a 3D translator of a document authoring application may be configured to receive an output document previously generated by the 3D translator as its input, and to render a two-dimensional view of the original input image elements using data in the output document representing a 3D view generated by the 3D translator. The output file may include any associated geospatial and/or non-geospatial data, which may be embedded in the 3D view, or may be stored separately within the document, in different embodiments. For example, the 3D functionality may embed any geospatial and/or non-geospatial data that was created or added during the operations illustrated as 130, 145, and/or 155, instead of, or in addition to, any data that was originally embedded in the input document, in various embodiments. As previously noted, such data may be embedded in the output document in constructs that are extensions of a standard document format, in some embodiments.

In an embodiment of the 3D translator that includes a GUI, a user desiring to create a 3D map may load an existing page in a document authoring application (e.g., one containing one or more 2D map images) or a blank page in the document authoring application using the GUI, may select a 3D drawing tool (e.g., by selecting an icon representing the tool using a mouse and cursor), and may trace a rectangle on the existing or blank page. Tracing a rectangle may invoke a dialog to choose a file (e.g., if a blank page is loaded) and/or a script for the translation operation. For example, the dialog may prompt the user to choose a JPEG file containing a map image using a "file" option. The user may in some embodiments have the option to control how much image and/or geometrical detail is used to represent the model, trading off PDF file size vs. fidelity through selections made in the dialog. The user may also be able to select what types of geospatial and/or non-geospatial information to include in the 3D view and/or how this information is to be displayed (e.g., using color, texture, height fields, integrated text, a pop-up text box, a markup language, etc.), or there may be default settings for the amount and type of information displayed. The user may also be able to select a given projection for the 3D view (e.g., a WGS84 projection, or another projection). Once selections are made, the file may be converted to a 3D model including Earth curvature via a WGS84 projection, in this example, with the 2D image appearing at a given Latitude and Longitude extent draped over a spheroid the size of the Earth, and including any geospatial and/or non-geospatial information selected for display by the user (and/or by default). The user may then select an operation to save the page in a new PDF file or in an existing PDF file, in this example.

Figure 2:
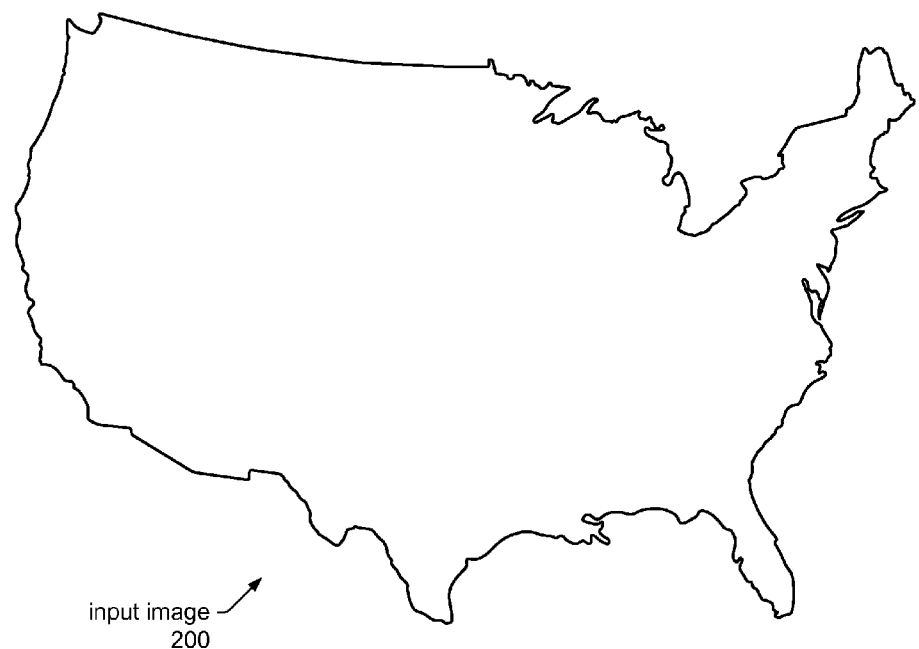
FIG. 2 illustrates in input image comprising a 2D map, according to one embodiment.
Figure 3:
FIG. 3 illustrates an output image comprising a 3D view of a 2D map, according to one embodiment.

FIGS. 2 and 3 illustrate an example of a 3D translation, according to one embodiment. FIG. 2 illustrates an input image 200. In this example, input image 200 is a 2D (flat) map of the continental United States. As described herein, this map may be included as an image file in an input PDF document, in some embodiments. In this example, a 3D translator may be invoked to convert the 2D map to a 3D model. FIG. 3 illustrates an output image 300, the result of such a translation. In this example, output image 300 comprises the map of the continental United States draped over a spheroid in a position corresponding to the latitude and longitude extent of the continental United States on the Earth. In other words, in this example, each point in the 2D map has been mapped onto the spheroid model of the Earth according to its latitude and longitude. In this example, the model is based on a WGS84 projection. Other embodiments may support other projection models, or may include multiple projection models selectable by the user for different applications. Note that in some embodiments, a 2D map may have associated height information for one or more points of the 2D map, and the 3D translator may be configured to generate a 3D view in which the surface of the Earth, and hence, the map, may appear to be perturbed or may be colored according to this height information (not shown).

Figure 4:
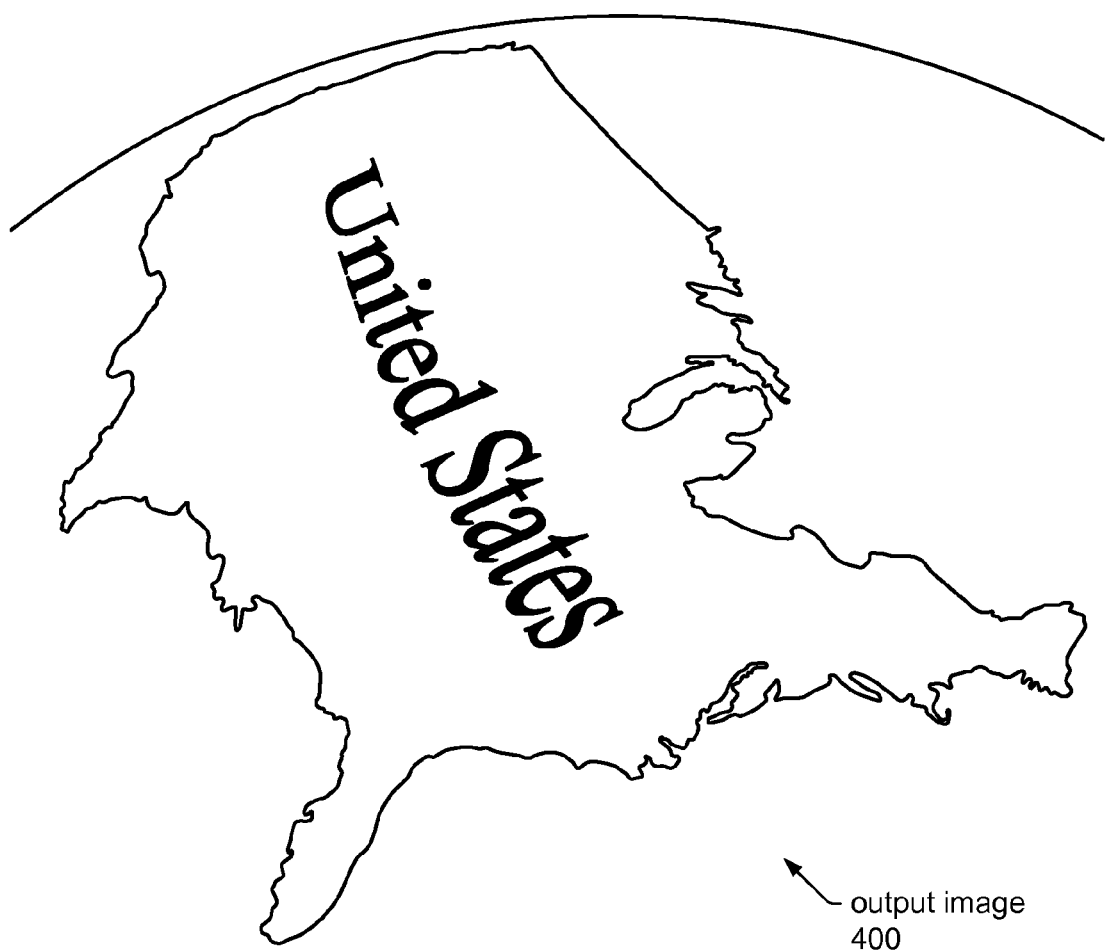
FIG. 4 illustrates an output image comprising a 3D view of a 2D map, according to one embodiment.

As noted above in reference to FIG. 1, a 3D translator may be configured to include additional information when generating a 3D view of a 2D map. For example, in addition to geospatial information, such as position and/or extent information, the input file may include non-geospatial information associated with the 2D map and/or with particular points or extents of the 2D map. As described above, such non-geospatial information may be included in a 3D view projected onto the Earth model, or may be included in the 3D view as separate or floating text. FIG. 4 illustrates an output image 400, comprising a 3D view that includes non-geospatial information projected onto the Earth model. In this example, a name, "United States", has been associated with the 2D map, and a text label containing that name is shown draped across the center of the map of the continental United States. Similarly, if an input document includes multiple 2D maps, each map may be associated with a name and that name may be included in a respective 3D view for that map. Note that non-geospatial information (e.g., height data, text, statistical information, etc.) may be associated with a point or region of a 2D map instead of, or in addition to, being associated with the map as a whole. In such embodiments, a 3D view of the map may include multiple such items of information projected onto the spheroid model of the Earth at points or in regions of the map with which they are associated.

Figure 5:
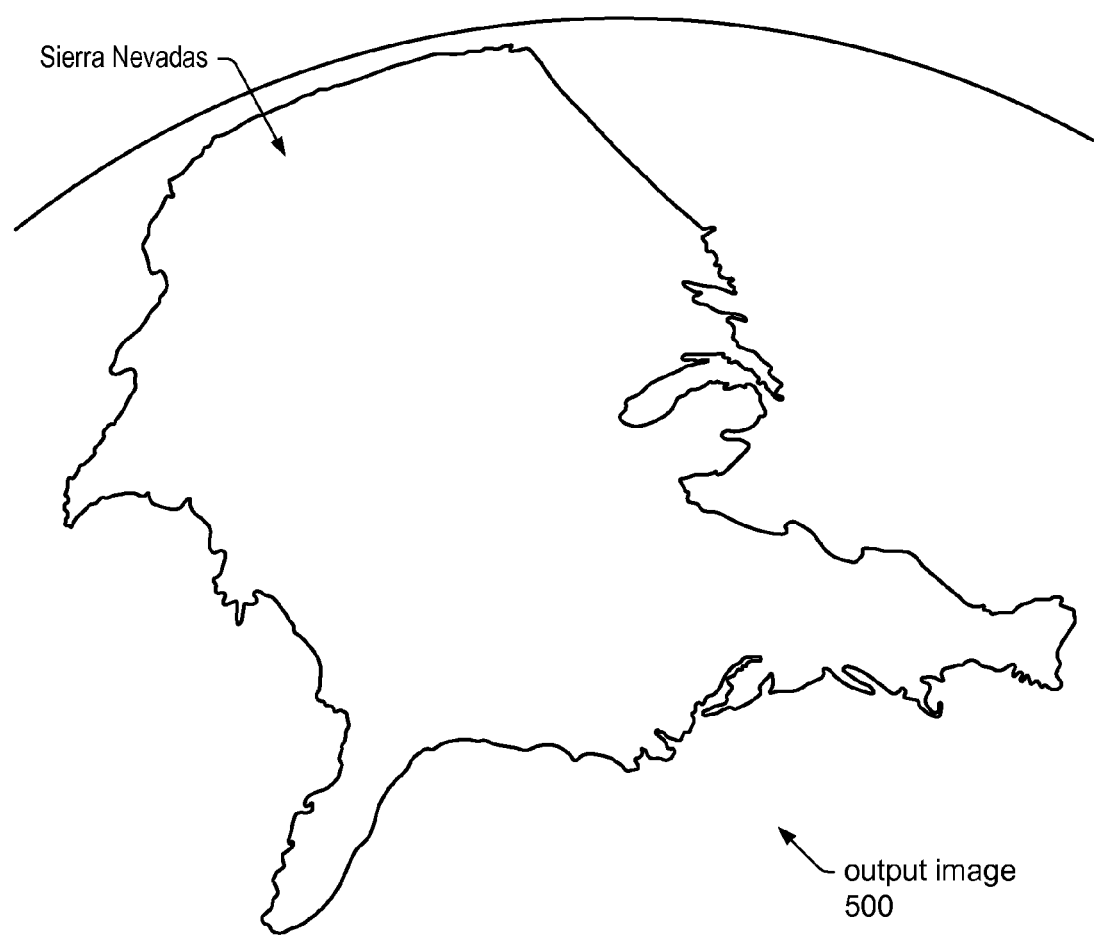
FIG. 5 illustrates an output image comprising a 3D view of a 2D map, according to one embodiment.
Figure 6:
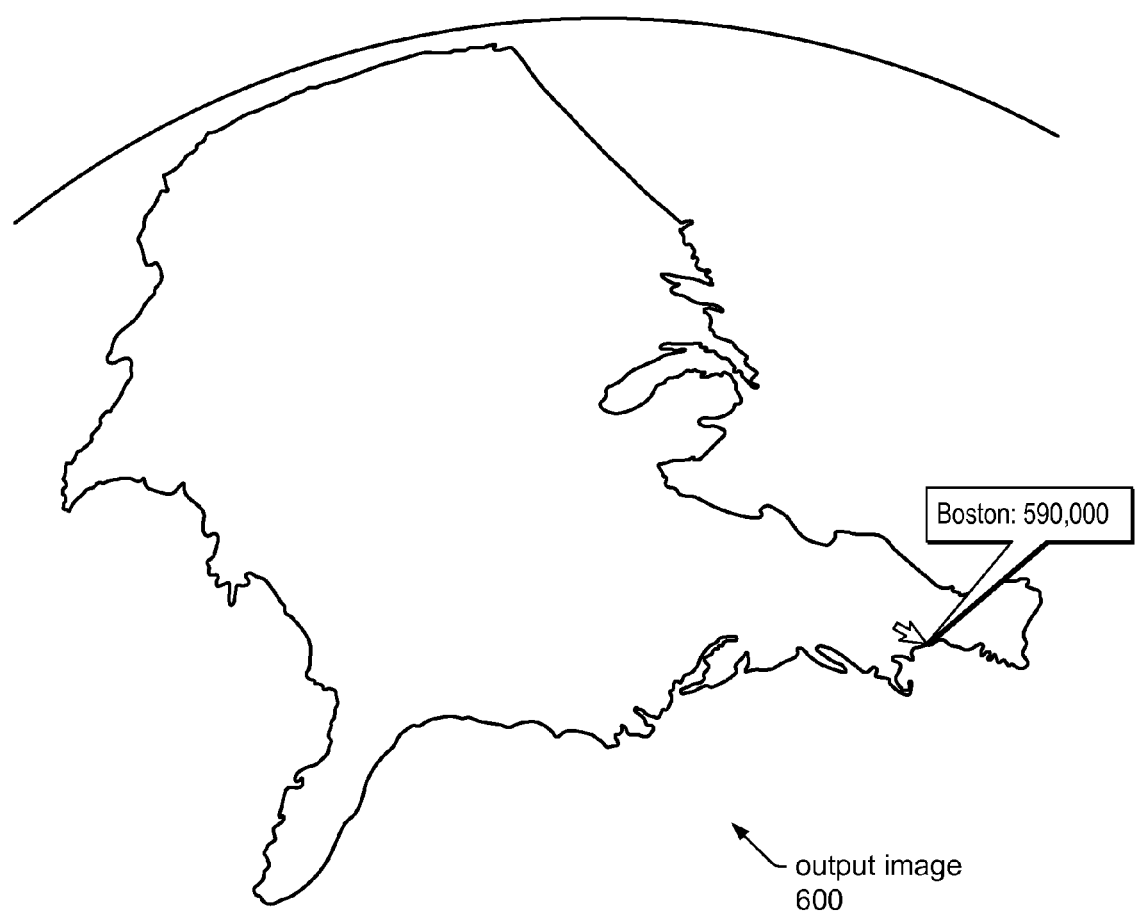
FIG. 6 illustrates an output image comprising a 3D view of a 2D map, according to one embodiment.

FIG. 5 illustrates an output image 500, comprising a 3D view in which the translator has included non-geospatial information as anchored text, rather than as text draped over the Earth model. In this example, a text label corresponding to the Sierra Nevada mountain range is anchored to a point designated in the 2D map as a location within the mountain range (e.g., a center of the range, a location of a national park office, or another significant location within the range). Note that, as described above, other types of non-geospatial information associated with a 2D map, or a point or portion thereof (e.g., population information, climate information, or any other information of interest), may be included in a 3D view as separate, anchored, or floating text by the 3D translator. FIG. 6 illustrates and output image 600, which includes an example of floating text (e.g., a text box that "pops up" when a cursor passes over a given point or region of an image). In this example, a user has moved a cursor over a location on the map that is within an extent associated with the city of Boston, which has a population of 590,000. In this example, a pop-up displays the name of the city, along with its population data.

Figure 7:
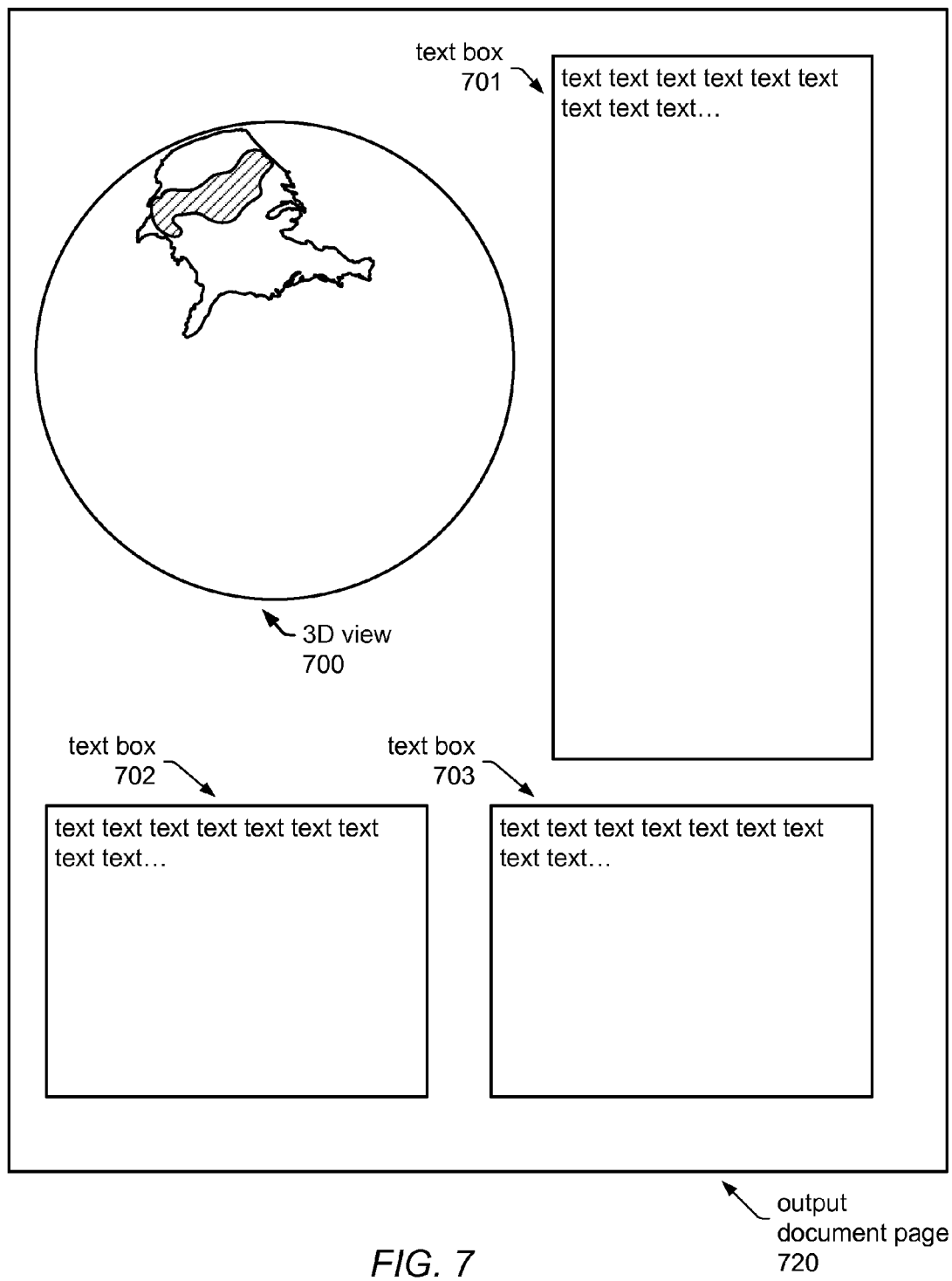
FIG. 7 illustrates an output document page comprising a 3D view of a 2D map, according to one embodiment.

As noted herein, in some embodiments, the 3D translator may be configured to modify a 3D view to depict geospatial and/or non-geospatial information associated with a map by adding texture and/or color to the 3D view to indicate height data, climate data, population data, or any other relevant information. In some embodiments, the 3D translator may use texture and/or color to highlight a given geographic or geopolitical feature (e.g., a mountain range, a plain, a body of water, an appellation, a city, state, or country, etc.) The 3D view depicted in FIG. 7 as 3D view 700, for example, illustrates the use of color in displaying geospatial and/or non-geospatial information, according to one embodiment. In this example, the shaded area represents a geographic feature, the Great Plains area of the continental United States. FIG. 7 illustrates 3D view 700 (which may have been generated using a 3D translator from the input image illustrated in FIG. 2), saved on a page of an output document (e.g., output document page 720), as described herein. In this example, output document page 720 also includes text, shown as text boxes 701, 702, and 703. In various embodiments, a page of an output document may include anchored or floating text, one or more text boxes, 2D images, and/or 3D views, and may be created, viewed, edited, and/or printed from within a document authoring application. A page of an output document may in some embodiments include embedded geo-spatial and/or non-geospatial information, which may or may not be visible from within the document authoring application or when the page is printed. In some embodiments, such embedded information may be selectively visible, according to document or user preferences, user interaction with the page, or the application of various functions (e.g., measuring or simulation functions) to the page and/or any images thereof.

Note that in some embodiments, non-geospatial data (e.g., an identifier of a mountain range or other geographic or geopolitical feature, or the name and/or statistical data associated with a point location or a latitude/longitude extent) may be embedded within the input document containing a 2D map. In other embodiments, non-geospatial information associated with a 2D map, or a portion thereof, may be imported from a separate file or database from which additional input data is retrieved, according to a selection made by the user when generating the 3D view. For example, in some embodiments, a dialog invoked when a document is opened or when the 3D translator is invoked may prompt the user for additional input files (e.g., one or more files other than the input document containing the input 2D) containing geospatial and/or non-geospatial data relevant to the input map. In some embodiments, the 3D translator may be configured to access a local or remote data store (e.g., a database or library) containing geospatial and/or non-geospatial information that may be included in a 3D view of a map.

In some embodiments, some or all of the original data in an input document may be retained in the output document. For example, in various embodiments, the output document may retain text or other non-geospatial information that was included in the input document (i.e., non-map data). In some embodiments, a 2D image in an input document may be replaced by a 3D view, with the 3D view being placed in a location in the output document corresponding to the location of all or a subset of the 2D images that were included in the input document. In other embodiments, a 2D image may be retained in the output document and a 3D view generated from that 2D image may be placed in close proximity to the 2D image in the output document. Note that in some embodiments, object data (e.g., data specifying a visibility, appearance, or orientation attribute) within the 3D view may be derived from a subset of the data representing one or more 2D images in an input document. For example, the 3D data derived from a plurality of 2D images in the input document may be aggregated into a plurality of 3D views in the output document. Each of the 3D views may be placed in the output document in a location corresponding to the location of one or more 2D images of the input document, and may exhibit attributes derived from the corresponding 2D image(s). For example, one of the 3D views may be oriented according to object data derived from one of the 2D images, or may have visual attributes (e.g., visibility) set according to object data derived from one of the 2D images, resulting in particular visual priority being given to the 3D view.

Because the system and methods described herein are document-based, in some embodiments the user may apply operations to documents comprising a 2D input map and/or a 3D view of a map that are the same as or similar to operations that may be applied to documents that do not include these elements. For example, in some embodiments, markup and/or measurement operations of a document viewing application (e.g., Acrobat®) may be applied to a 3D view that has been generated as described herein. In such embodiments, measurements (e.g., point position and/or length measurements) made on the 3D view of a map may be displayed in terms of coordinates on the Earth (or another celestial body on which the map is displayed). For example, these measurements may be displayed in terms of absolute or relative latitude and longitude instead or, or in addition to, absolute or relative feet, meters, miles, etc. In some embodiments, the 3D translator described herein may be a component of such a document viewing application. A measurement function that may be applied to the 3D views described herein is described in more detail later, according to different embodiments.

Another feature of the system described herein may be a mode for viewing a fly-by and/or fly-through navigation of a scene. Such a tool may in some embodiments allow the user to "fly" much closer to the displayed surface than with other navigation tools, which are primarily designed for inspecting objects a few centimeters to meters across. In some embodiments, the user may have finer control over the navigation as the navigation gets close to the surface of the Earth, e.g., with the fly tool slowing down. In some embodiments, the map through which the user may navigate may be displayed as an image draped on a mesh. There may or may not be individual points or portions of a map to inspect (e.g., with additional detail not displayed in the standard 3D view), in different embodiments. Operations included in a fly tool may include viewing/navigating a map in 3D, and measuring location and distances on the map. Some embodiments may provide support for input file formats that include height information in addition to the 2D appearance and metadata that a 2D geospatial display may support. In some embodiments, the fly tool may be able to navigate through objects. In such embodiments, the user may be able to "dive" underneath the terrain, and may become disorientated unless they pull up and fly back up above the ground again. Such embodiments may include a collision detection function to enable such a feature. Fly-through capability may in some embodiments be suitable for applications such as the inspection of objects beneath objects from the outside in. For example, a tunnel, bridge, underground gas pipeline, or building may be overlaid onto some georegistered terrain, and a fly tool may allow inspection of that terrain in the 3D view. A fly tool that may be applied to the 3D views described herein is described in more detail later, according to different embodiments.

As described herein, WGS84, which may be considered the current de facto standard for 3D representation (e.g., GPS systems use this projection model), is used as the default projection by the 3D translator. As described above, in some embodiments, the Earth is modeled as a spheroid, rather than a sphere. This is because the Earth has a slightly larger radius nearer to the Equator, as rotation forces tend to cause a bulge there and a flattening at the Poles. In some embodiments, the 3D translator may project all maps onto a WGS84 3D projection, with a standard known Polar and Equatorial radius, to produce a relatively realistic 3D model. In addition, having all geospatial information projected to a standardized coordinate system may allow content merging of multiple maps into one consistent space.

Note that in some embodiments, geospatial and/or non-geospatial data may be written to and read from the PRC file format. PRC is a 3D format that allows different representations of a 3D model to be stored in a PDF file. For example, PRC may support storage of a visual representation (e.g., one that consists of polygons) and/or the geometry that the model is based on. The PRC file format also supports compression to decrease file size during conversions or afterward in Acrobat®. The use of the PRC format may support Product Manufacturing Information (PMI), also referred to as Geometric Dimensioning and Tolerancing (GD&T), and/or Functional Tolerancing and Annotation (FT&A). Files storing 3D data in PRC may retain geometries for reuse in Computer Aided Design (CAD), Computer Aided Manufacturing (CAM) and/or Computer Aided Engineering (CAE) applications, in some embodiments. When loaded into the 3D translator, this data may be stored in nodes within the scene graph, and may provide extra information as to how the data is referenced to the surface of the planet. This data may also allow the document application to detect if a 3D model is geospatially referenced or not. In other embodiments, 3D files may be converted as Universal 3D (U3D) data streams, rather than PRC data streams, and then stored in the resulting PDF file. The U3D format is an open standard format adopted by ECMA International used primarily for visualization and publishing purposes. It is also supported in CAD files created by many mechanical engineering applications, and may support animation. In some embodiments, the use of PRC and/or U3D formats may be selected by the user (e.g., through the GUI), or may be determine based on the particular application that was used to create the input file. The format used may determine which entities within the input file may be imported into the PDF.

Figure 8:
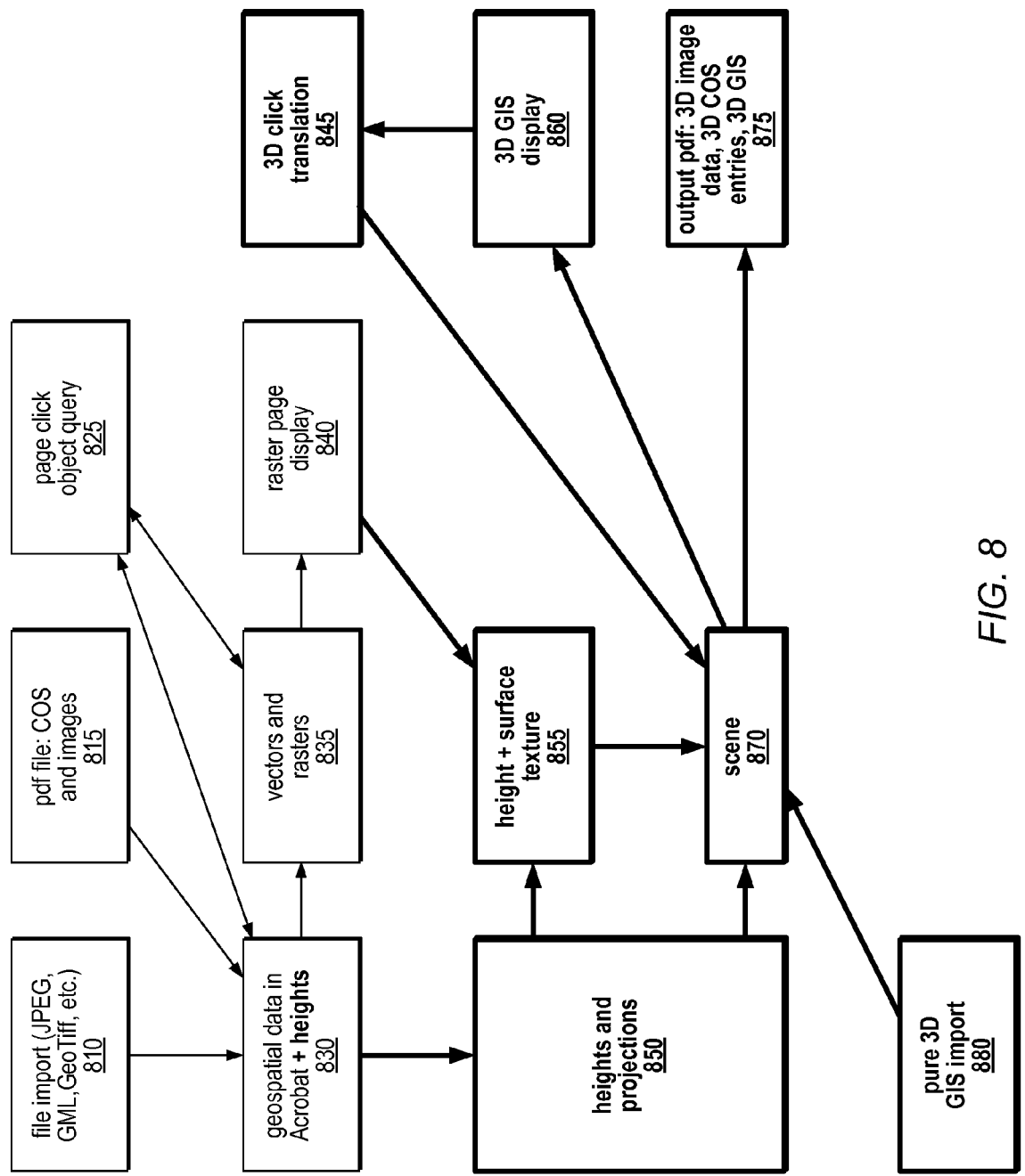
FIG. 8 illustrates the architecture of a system in which a 3D translator is built as an extension to the architecture of a 2D document authoring application, according to one embodiment.

A system supporting 3D translation of 2D maps, as described herein, may be implemented in various combinations of hardware and/or software components, and may include all or a portion of the features described herein, in different embodiments. For example, a full-featured 3D translator may support a richer data import and more optimal handling of GIS workflows than a more basic version of the 3D translator. FIG. 8 illustrates the architecture of a system in which a basic version of the 3D translator is built on top of a 2D document application architecture, according to one embodiment. In FIG. 8, extensions to the 2D document architecture are shown in bold text and bold text boxes, while plain text and plain text boxes indicate the original 2D document architecture. In this example, the tasks implemented by 3D extensions to the 2D architecture may be focused on generating a relatively simple 3D representation of a map to complement an original 2D map. In this example, the system may include functionality to generate a single object in true 3D along with navigation, measurement and commenting tools.

In the embodiment illustrated in FIG. 8, the functionality used to import 2D GIS data may be leveraged to provide support for importing data for the 3D translator. Thus, in this example, the 3D translator may be able to perform file importation (shown as 810) using existing functionality of the underlying 2D document application. As shown in FIG. 8, the system may be configured to support the import of files/documents in any of a number of standard and/or custom formats, including, but not limited to, JPEG files, Geography Markup Language (GML) files, GeoTIFF files, or any other file format that may support geospatial and/or non-geospatial information relevant to an input map. The example illustrated in FIG. 8 may be based on the 2D viewing/editing features of the Acrobat® document authoring application, and may import PDF files as native input to the application and/or may output PDF files, as in 815. As described above, an input PDF file may include images (e.g., 2D map images), and other embedded information (e.g., geospatial information and/or non-geospatial information). Note that a PDF document may be thought of as a stream of low-level objects, called COS objects, of a number of basic object types (e.g., Boolean, string, integer, array, name, stream, etc.). These COS objects may be arranged within the PDF document in a tree structure, in this example. In this example, geospatial data may be extracted from input PDF files for display and/or further processing, shown as 830. For example, in one embodiment, image and height data from a document-based representation of 2D map data may be transformed to an in-memory representation of that data within the document application.

In the example illustrated in FIG. 8, the architecture of the underlying 2D document application may support a page click object query (shown as 825), and may generate vector and raster information (as in 835), usable for displaying 2D data, as in 840. As noted above, in some embodiments, the 2D document application may allow for markups, measurements, and other operations on the images, geospatial information, and/or non-geospatial information imported into the application.

As illustrated in FIG. 8, new functionality (indicated in bold) may be added to the architecture of an underlying 2D document application to support 3D translation, as described herein. For example, the extensions may support the extraction of height information from the PDF input file and/or other input files, as shown by the bold text in 830. If height information is included in one or more of the input files, height fields and projections may be generated for the 3D view by the 3D translator functionality, shown as 850. Height fields and projections may be added to the raster page display information of 840 when translating the 2D image into a 3D view. This additional information may appear as height and/or surface texture modifications in the 3D view, as in 855. Therefore, in this example, the user may see a part of the Earth's smooth surface (if there is no height information available) or a height field on the Earth's surface, if heights are available in the input file(s). In this example, a texture derived from back-projecting a 2D raster drawing of the GIS data may be overlaid on the Earth's surface, as described herein. The result may be true 3D, and may be geo-coded so that geographic positioning and/or measurements may be possible. In the example architecture illustrated in FIG. 8, no objects may be imported. Instead, raw height information or raw texture information may be imported as a single large object. In this example, the model tree may have simple mesh objects, without GIS objects or coverage/layers.

The example architecture illustrated in FIG. 8 may in some embodiments be used to produce a single layer texture representation of a map overlaid on a height field. For example, this architecture may be configured to produce a 3D representation that is similar to a Virtual Reality Modeling Language, or VRML, model, but with the addition that the model may be geo-coded for measurement and may support better navigation, as it is known this it is based on GIS data. As shown in FIG. 8, the 3D translation functionality may in some embodiments support the importing of pure 3D GIS data, as in 880. This data, along with the information output by operations shown as 830, 850, and 855, may be used to generate a 3D scene, as in 870. In some embodiments, the 3D functionality may include support for user interaction, such as a "3D click translation" function, shown as 845. This 3D translation function may take as input a 3D GIS display (860) of the scene generated at 870, and may feed back information into the scene based on the user interaction, as shown in FIG. 8. For example, a scene 870 may initially be displayed from a given viewpoint on a given rendering of the data 860, and user interaction (as in 845) may result in a change in the state of the scene (e.g., the viewpoint may be changed, the appearance and/or visibility of an object may be altered, a measurement operation may be initiated or terminated, etc.) In this example, such a change may then be reflected in a subsequent display of the data 860. As described herein, the 3D translation functionality may be configured to generate an output document, shown in FIG. 8 as an output PDF document as 875, which includes GIS data, 3D image data (e.g., data representing the 3D view), and/or 3D COS entries. In general, the example architecture illustrated in FIG. 8 may support translation from internal 2D storage to 3D storage, any may support the ability to embed additional GIS data within the 3D format and 3D COS entries.

Figure 9:
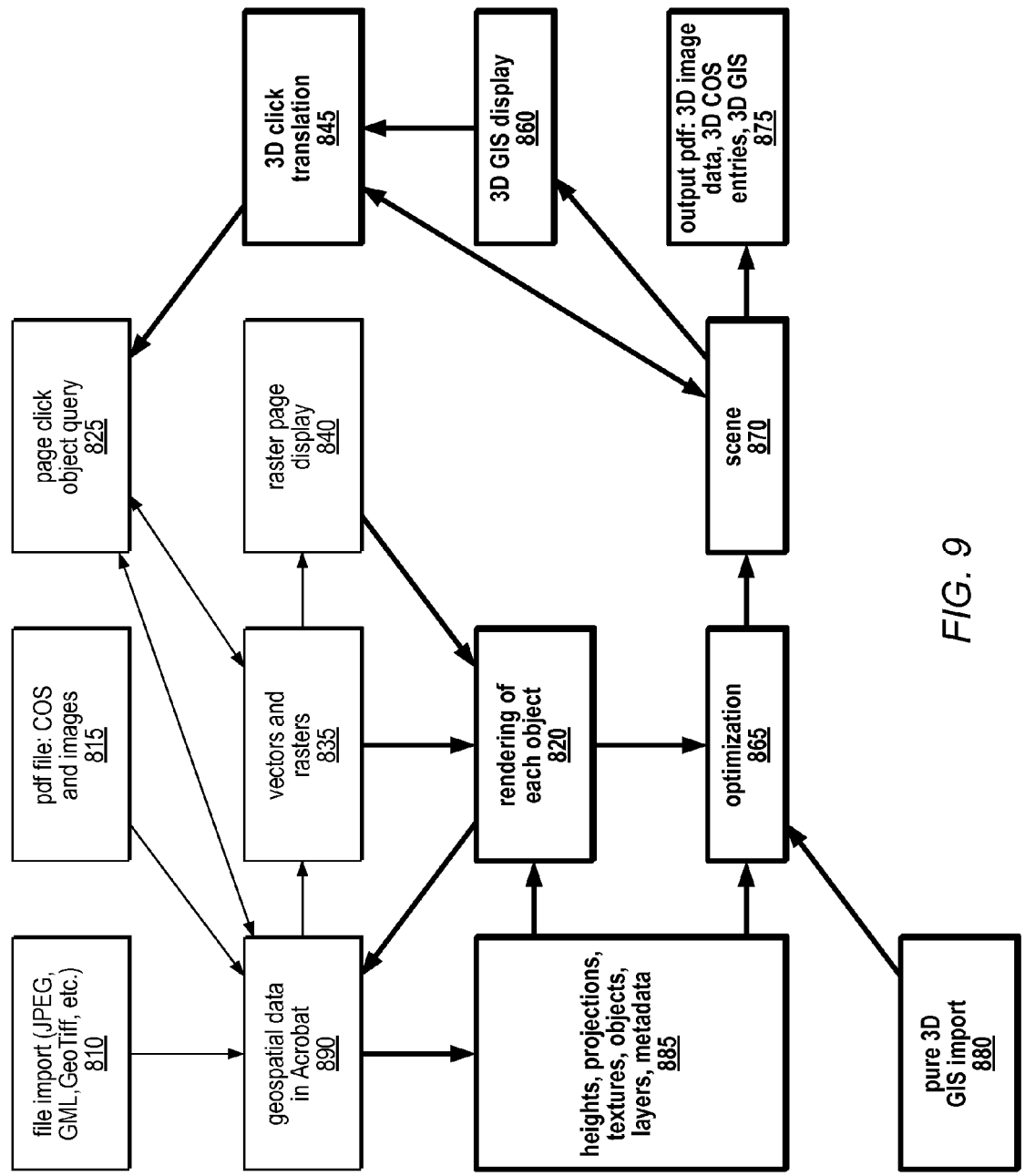
FIG. 9 illustrates the architecture of a system in which a 3D translator is built as an extension to the architecture of a 2D document authoring application, according to one embodiment.

A second example of an architecture that may be suitable for implementation of the 3D translator described herein is illustrated in FIG. 9. The architecture in this example may include further extensions to a 2D document application, with the additional functionality targeted to support for importing even richer data, and for more efficient GIS workflows. Again, extensions beyond the underlying 2D document application, many of which are similar to those illustrated in FIG. 8, are shown in bold. Additional extensions, in this example, include support for textures, objects, layers, and metadata, as in 885, and the separate rendering of each object, as in 820. In some embodiments, the rendering operation may feed data back into an in-memory representation of the data, shown as the feedback from 820 to 890. For example, when a set of complex data is projected onto an image, the image itself may be used as a simplified representation of the complex data. In one embodiment, feedback may be provided to the original 2D data so that it may be translated on the fly, allowing display of relevant portions of the model without translating the entire model. In the example illustrated in FIG. 9, this may be implemented in two steps. The first may involve the translation from a 3D click to a page-based click, shown as the path from 845 to 825. The second, shown as the path from 825 to 890, may involve translating the page-based click to an action taken on the geospatial data within the document authoring application. Alternatively, the page-based click may be translated to an action taken on vectors and raster data, shown as the path between 825 and 835 in FIG. 9. In various embodiments, such feedback may allow querying of the 2D data for information discarded during translation, but which may still be conveyed to the user.

The example illustrated in FIG. 9 also includes an optimization operation, shown as 865, before generation of the scene, at 870. Optimization may in some embodiments involve the culling of elements judged extraneous to the desired end result. For example, the height data may include more detail than is practical to display, or document text unrelated to the image and/or geospatial data may be present and may be removed or kept, as desired. In some embodiments, the system may be configured to recognize redundant data and remove it. For example, the height data included in the input data may all be expressed as being relative to sea level, in which case fewer values may represent the whole (e.g., through a lossless or lossy compression). In another embodiment, the system may be configured to recognize that multiple maps obtained from a single input document contain redundant or non-useful data. For example, if the input data includes data that overlaps and/or has a substantially identical visual appearance, only one copy of that data may be retained. In the example illustrated in FIG. 9, the bi-directional path from 870 back to 845 may indicate that the scene itself may influence the type of user interactions that are possible. Such a feature may in some embodiments permit different appearances, tools, or cursor icons to be displayed in a GUI dependent on the content of the scene. In addition, an action taken at 845 may result in a query of the scene 870, and if portions of the scene are missing, additional translations may be initiated for the missing portions.

In this example, the extensions to support 3D translation functionality may be much more involved for both 2D (e.g., as it may support more data types) and 3D. For example, in some embodiments, instead of having the existing 2D component draw textures with most GIS objects, the objects themselves may be converted one by one and placed in a scene graph. Note that in many 2D maps, objects are represented as symbols. For example, buildings in USGS maps may be represented as black filled rectangles, and roads may be represented as lines with different solid or dashed interiors depending on their classification. Other mapping agencies may have different drawing conventions. Given that a 2D conversion (e.g., included in an underlying 2D document application) may already create the appropriate layout, symbols and colors for a 2D display, it may in some embodiments be advantageous to leverage this work to create planar symbols for display in 3D. In this manner, 2D and 3D display may be more consistent. In the example illustrated in FIG. 8, all objects may be rendered into a large texture. In the example illustrated in FIG. 9, each object may be individually rendered.

Note that individual objects may in some embodiments be made visible or invisible, requiring selection code in the 3D translation functionality. In some embodiments, the 2D appearance or true 3D appearance of every object may need to be drawn and stored in the 3D scene graph, along with the abstract object type from which the symbol was derived, so that meaning is retained. In some embodiments, other capabilities may be included in the 3D file format. For example, texture animation for time series data may be supported, in some embodiments. In such embodiments, additional extensions may be added to an underlying 2D document application to support storing such data within the scene graph and exporting it to U3D or PRC.

Note that while the examples illustrated in FIGS. 8 and 9 depict 3D translator architectures and operations based on an underlying 2D document application, in other embodiments, a document application that includes a 3D translator, as described herein, may be developed independently from existing applications, and may be specifically directed to 3D translation of 2D images (e.g., maps), and other 3D operations on those 3D views, as described herein. Such independently developed applications may in some embodiments include many of the operations illustrated in FIGS. 8 and 9, including those supporting 2D images, and may have an architecture similar to those depicted in either FIG. 8 or FIG. 9. Other independently developed applications may have a different architecture than either of those illustrated in FIGS. 8 and 9, and may include more, fewer, or different operations than those depicted in FIGS. 8 and 9.

As previously noted, a 3D translator, as described above, may include one or more dialogs, in various embodiments. In some embodiments, such a dialog may be based on a dialog included in a 2D document application, with added functionality to support operations of the 3D translator, while in other embodiments, an independently developed 3D translator may include dialogs directed to 3D translation of 2D images (e.g., maps) that are not based on those of a 2D document application. In one example, functionality may be added to an existing 2D dialog to enable and/or disable PRC compression, e.g., via a checkbox and string, in some embodiments. In another example, additional controls may be added to an existing 2D dialog to allow the user to vary texture image size and geometrical detail. In some embodiments, the texture image size and geometrical detail may be controlled as a percentage of recommended size, e.g., to override an automatic algorithm and/or default setting (e.g., 100% may be the default algorithm detail) through a dialog of the 3D translator. Greater values, e.g., up to 1600%, may in some embodiments allow for extra detail, which in some cases may be superfluous and in other cases may make for a richer looking model. In some embodiments, upper level detail may be clamped if, for example, it exceeds the maximum image size that 3D libraries can deal with. Lower values, e.g., down to 25%, may allow reduction of detail below the recommended minimum. In some cases there may be no change in the model, even if requested through a dialog. For example, a request to go below a minimum number of mesh triangles may mean it is not possible to represent the model. In such cases, the internal algorithm of the 3D translator may choose to clamp the result to one in which a minimum number of triangles is present to create a model covering the approximate extent of the original data. In other embodiments, this may not be included, as the import process may have complete control over image scaling. Other dialogs included in the 3D translator may support image import (e.g., selection of one or more files and/or images therein for importation and translation), and/or geospatial 2D image conversion options (e.g., selection of a projection format, selection of an output file format, etc.)

An import operation, such as that illustrated in 810 of FIGS. 8 and 9, may involve reading image data, geospatial data, and/or non-geospatial data into the 3D translator. In some embodiments, pure 3D GIS data may also be imported into the 3D translator, as in 880 of FIGS. 8 and 9. As noted above, importing data (e.g., selecting files and/or data to import) may in some embodiments be done through a dialog (e.g., using a GUI). Note that some GIS formats may be used in generating with a 2D or 3D view. For example, in one embodiment, the user may "drag and drop" a JPEG2000 file into the document application, which may include data to be displayed as a 2D image (e.g., using 2D functionality thereof) and/or may serve as an input to the 3D translator. In this example, a 2D translator of the document application may automatically read the JPEG2000 file. For 3D creation, a user may in some embodiments create a 3D annotation, and then load a JPEG2000 file into it using a 3D importing dialog. The 3D translator (and/or an existing underlying 2D document application) may in various embodiments be configured to import files in multiple standard and/or custom formats. The files imported may in turn include embedded image data, geospatial data, and/or non-geospatial data. For example, the imported files may include data formatted in one or more of TerraGo, National Imagery Transmission format (NITF), Extensible Markup Language (XML), Keyhole Markup Language (KML), JPEG, JPEG2000, TIFF, GeoTIFF, CATIA, Drawing Exchange Format (DXF), GML data, or any other 2D or 3D geospatial information, and this data may be translated to 3D data by the translator.

Note that some embodiments of the 3D translator may support ESRI shapefiles, while others may not. In still other embodiments, ESRI shapefiles may be supported by 2D functionality, but not by 3D functionality, such as the 3D translator described herein. Since shapefile data may represent minimal lines without any context, a map may be needed to view actual location. A single shapefile may typically include a set of lines in empty space, which may appear as a blank page or texture with a few lines, and, thus, may not be very useful. Note also that in some embodiments, the 3D translator may be configured to import only one file alone, while a 2D application may be configured to support the importing of multiple files and multiple layers one by one, and to overlay them on a map. As a result, an example workflow for the 3D translator may involve authoring a rich 2D map (which may include data imported from a shapefile), saving that 2D map as a PDF file, and then loading that PDF into the 3D translator to author rich 3D data.

Note that in some embodiments, text (e.g., text embedded within an input or output file representing geospatial and/or non-geospatial data) may be stored as Unicode. The feature may have a localization dependency on the specification of units in a measurement operation (e.g., the units specified in a dialog of a measurement operation), as described later. For example, in one embodiment, measurements, distances, or other data expressed using strings (e.g., text for "feet" or "miles") may be automatically translated from one language used in an input document into a (different) local language before being stored in the output document. In some embodiments, this feature may also have a localization dependency on the compression string and geometrical and texture detail strings of a file import dialog to enable/disable PRC compression.

In some embodiments, the 3D translator may use plugins to import files in supported non-native file formats. Such plugins may also be used to extract symbols for a page representation (e.g., from files in non-native file formats), in some embodiments. In some embodiments, the 3D translator may be configured to extract complex map boundaries for meshes and textures. The 3D translator may also be configured to generate a visual representation with appropriate symbols when only abstract data is present. In addition, the 3D translator may be configured to read or infer height data from an input document, and to translate that data into a 3D representation that includes camera orientation information. For example, in some embodiments, some file formats supported by the system may support embedded height data, while others may not. Note also that some GIS datasets do not include camera information. However, some maps may appear microscopic, oblique, upside down, or facing away from the user, depending on latitude/longitude and extent. Therefore, in some embodiments, the 3D translator may need to support datasets for which cameras orbit Earth's center, and/or datasets for which camera are local to a scene. In some embodiments, these may be authoring options. For example, in some embodiments, the user may place a camera at a specific geospatial location (e.g., by specifying a location using a dialog invoked by the 3D translator). In some embodiments, the 3D translator may map images to a geoid, which may be useful in supporting a measurement function. Such a mapping may affect camera-related functionality, in some embodiments. In such embodiments, the 3D translator may include functionality to handle overlap cases, e.g., when multiple, overlapping map segments are present in an input document.

As previously noted, in some embodiments, a document application supporting 3D translation of 2D images (e.g., maps) may be based on a 2D document application. In such embodiments, a bridge application (e.g., an application to carry data across from a 2D document application to a 3D document application that includes a 3D translator) may be used to extent the functionality of the 2D document application. Such a bridge may in some embodiments allow an existing 2D document application to create 3D content, which may be input to the 3D translator. For example, in one such embodiment, a user may create a 3D annotation in a GIS format. Instead of reading that annotation using a plugin deep down inside PRC code, a 2D GIS importer (which may normally be configured to create a 2D PDF page) may read the data. However, instead of making the page, the data (e.g., expressed in an intermediate representation, or as new COS entries) may be sent back to the 3D side. The importer may be configured to read basic height data in addition to vectors, coverage and imagery. In some embodiments, the data may be drawn (e.g., much like a print or screen dump) to embed GIS symbols into the image. The 3D translator may then parse and make sense of this data, translating it to 3D scene graph objects. In such embodiments, the 3D translator may be configured to translate the intermediate format or the COS entries, and to move this translated data into the 3D scene graph. In some embodiments, the 3D translator may read and parse a large number of 2D COS entries, some of which include GIS data. In other embodiments, the system may support an intermediate format for 2D that may be input directly to the 3D translator. In embodiments in which multiple input formats are supported, different importers (e.g., 2D importers) may translate input data into a single internal 2D format (e.g., a native format of the document application), and a single translator may be used to translate data from this internal 2D format to 3D. Note that in other embodiments, a 3D translator that is developed independently from a 2D document application may be configured to import multiple 2D and/or 3D formats and to translate them into a 3D view that may be operated on by 3D functionality (e.g., a measurement function), as described herein.

Another feature of the 3D translator may be support for measuring within an image across projections. For example, the 3D translator may support measurement even where the measurement function encounters non-map data, in some embodiments. In such embodiments, a document application that includes a 3D translator may store region data indicating which portions of which 3D areas are based on given projections and/or which portions are based on non-projected data. For example, in the example architecture illustrated in FIG. 8, the 3D translator may be configured to extract the projection information from the input document and place the data in true 3D space. In this example, some projections may overlap, but the 3D translator may use simple rules to establish precedence. In some embodiments, the 3D translator may strip out all non-projected data, as this may complicate visual appearance and/or measurement, and may have limited utility in the 3D world. Therefore, in some embodiments, the 3D translator may be configured to recognize where the projected data (if available) is, to cut out the projected portions into images and meshes, to recognize and resolve any overlaps, and to remove any parts of the map that are not projected. The example architecture illustrated in FIG. 9 may include the ability to merge maps, in some embodiments. In such an embodiment, if the projected 3D map data exists, all the clutter of borders and non-projected data may removed, making it easier to join adjacent maps. Note that the merging and joining of maps may in various embodiments involve joining previously translated images in the 3D translator (e.g., aggregating them in the 3D translator after translating each one first) or importing multiple 2D images into the translator and translating and adding each one to the output 3D view as they are imported (e.g., by layering the translated images over the Earth model, or embedding each translated image in the 3D model itself).

As previously noted, in some embodiments, the 3D translator may include one or more native 3D importers, instead of, or in addition to, 2D importers. In some such embodiments, new translators may be included for support of new formats in an existing PRC or U3D direct import function. In one embodiment, support for native 3D importing may be limited to a subset of commonly used formats, e.g., a subset of GeoTIFF or JPEG2000, where no symbol parsing may be needed. In such an embodiment, the 3D importers may generate an unprojected dataset from imported files with some metadata giving projection details. In such an embodiment, additional functionality may take a mesh, a texture, a boundary extent and metadata projection information and the data may be re-projected and fitted. In another embodiment, a limited set of formats may be supported for native 3D importing, but projection libraries may be included that may be used by the 3D translator in generating the 3D views. In yet another embodiment, a wide range of native imported formats may be supported. In such an embodiment, more interfaces for projection libraries and symbol generation may be included in the 3D translator. Native importers may be included in either a 3D translator based on an existing 2D document application (with minimal dependencies on 2D functionality) or in an independently developed 3D translator, in different embodiments.

As noted above, a document application that includes a 3D translator may include functionality configured to implement a fly tool. Such a tool may be configured to automatically determine if a 3D model (e.g., one generated by the 3D translator) is geospatially enabled, e.g., by the use of extra projection metadata that is stored at nodes within a scene. In some embodiments, a fly tool included in a document-based application may behave differently depending on the image content being displayed and/or simulated within that document-based application. For example, a simulation of a 3D view that includes geospatial content associated with an image may cause the fly tool to exhibit different behavior (and/or to support different features) than a simulation of image content originating from the architecture, engineering, and construction (AEC) industry. Content-dependent constraints may include a limitation on the motion of the simulation and/or an enhanced freedom of movement in the simulation, in various embodiments. For example, AEC models tend to be planar, and a fly tool for an AEC application may typically have constrained motion, e.g., without any allowed roll. However, geospatial models may be at arbitrary orientations. For example, to view a detailed map of Antarctica, the user may desire to "fly" upside down thorough the 3D model, so that the ground is at the bottom of the display rectangle and the sky at the top. Typical map viewing software may start from a wide view with North at the top of the screen. The fly tool described herein, e.g., a geospatial fly tool, may be configured to allow the user to arbitrarily turn, roll, and/or fly upside down, if needed. In such embodiments, the user may get lost, and if so may in some embodiments invoke an AEC based tool, which may immediately turn the camera so that North is up. In some embodiments, the user may have finer control over the fly tool as it slows down (e.g., as it gets close to the Earth). As previously described, in some embodiments there may be no ground collision detection, and the user may fly through the ground and back out again. The fly tool may in various embodiments be controlled through a command line and/or GUI, and may include various dialogs and interfaces to a mouse, scroll-wheel, or another input device suitable for controlling such a simulation tool.

As previously noted, a document application that includes a 3D translator may include measurement functionality, in some embodiments. For example, measurements may be made on a 3D view of a map generated by a 3D translator, as described herein. In such embodiments, when a Geospatial model is detected, a text box may be displayed (e.g., it may appear in a dialog), and may display the latitude and longitude of a model pixel over which the mouse cursor is placed. For example, the latitude and longitude may be displayed in signed degrees, minutes and seconds, and may update in real time as the mouse is moved. In some embodiments, the behavior of the measurement tool may be undefined if the mouse is moved over empty space, which may allow a user to easily determine whether a geospatial model is present.

Note that when distance is measured on a geospatial model, the distance may be calculated on the surface of the model rather than in a straight line. For example, if the tool points selected correspond to San Francisco and Bangalore, the distance displayed would be roughly that of the distance an aircraft would fly between the two points, rather than the length of a straight line through the Earth's core. As a result, the line drawn between the two points may extend far out from the Earth, in some embodiments. Note that distance may be displayed in model units (e.g., as the difference in latitude and longitude between two points) or in other distance measurements (e.g., miles), in various embodiments.

Note that the document application including a 3D translator of 2D images (maps) may or may not provide public application programming interfaces (APIs), in various embodiments. For example, in some embodiments only private (i.e., program development level) APIs may be supported. Note also that in some embodiments, the 3D translator may employ a proprietary projection methodology instead of, or in addition to, publicly and/or commercially available projection software. In embodiments of the 3D translator that are based on an existing 2D document application, files output by the translator may be backward-compatible with the existing 2D document application, with the only file format change being the addition of object adjunct data using existing mechanisms available in the document application's native file format. When viewed using the 2D application, a 3D model generated by the 3D translator may still be viewable, but may lack a geospatial reference (i.e., it may be viewed outside the context of a 3D projection of the Earth).

Note that while the document-based 3D translator disclosed herein has been described largely in terms of its application to the translation of 2D maps onto a 3D surface of a celestial body, it may in other embodiments be more generally applicable to the translation of any 2D image onto a 3D surface, provided location, extent, and/or projection information relative to the target 3D surface is embedded in the input document, or provided through user input, or an external source (e.g., a database, library, etc.) that stores information usable for mapping the image to the 3D surface.

Figure 10:
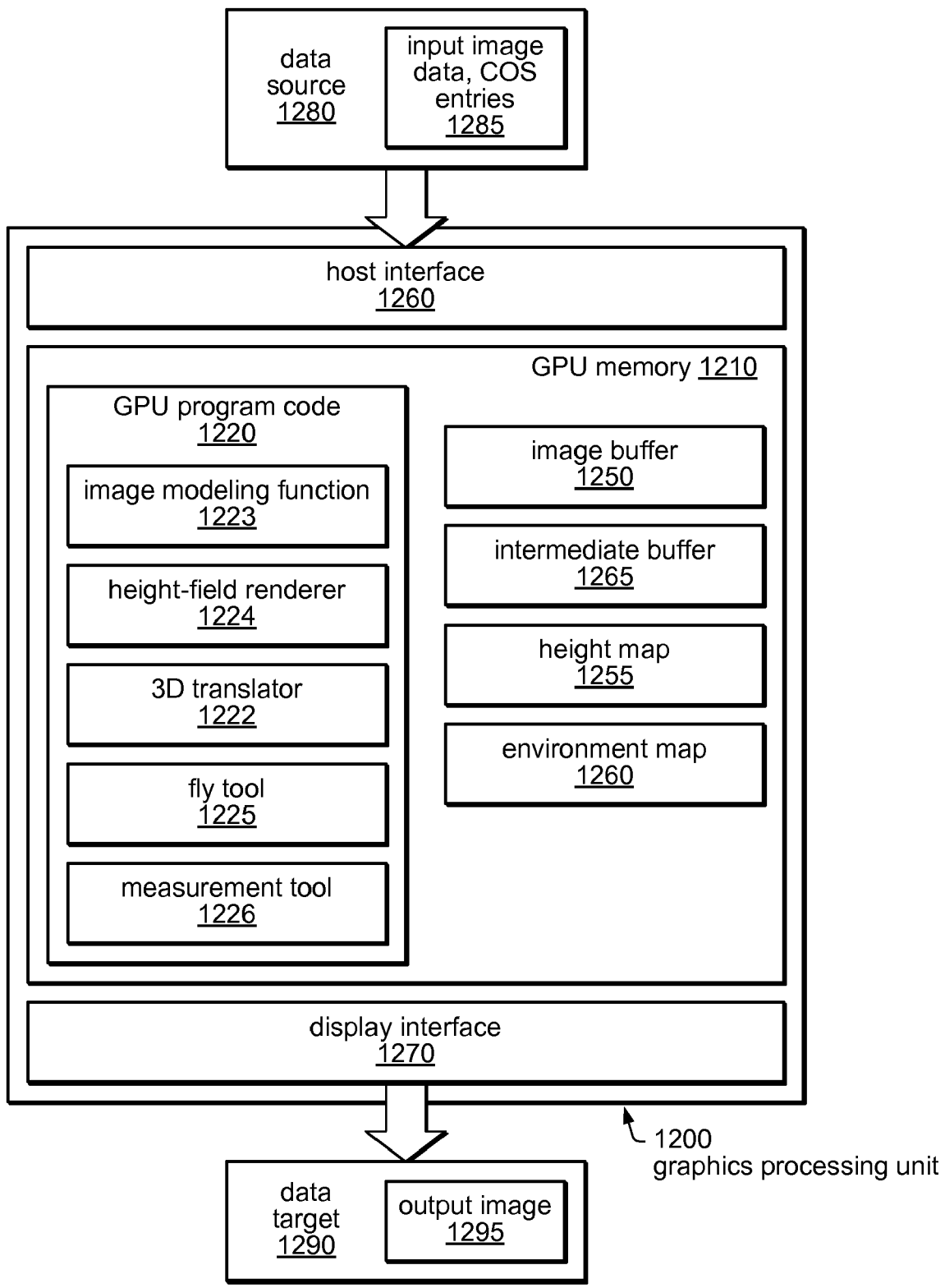
FIG. 10 is a block diagram illustrating one embodiment of a graphics processing unit (GPU) configured for generating 3D views of 2D maps, according to one embodiment.
Figure 11:
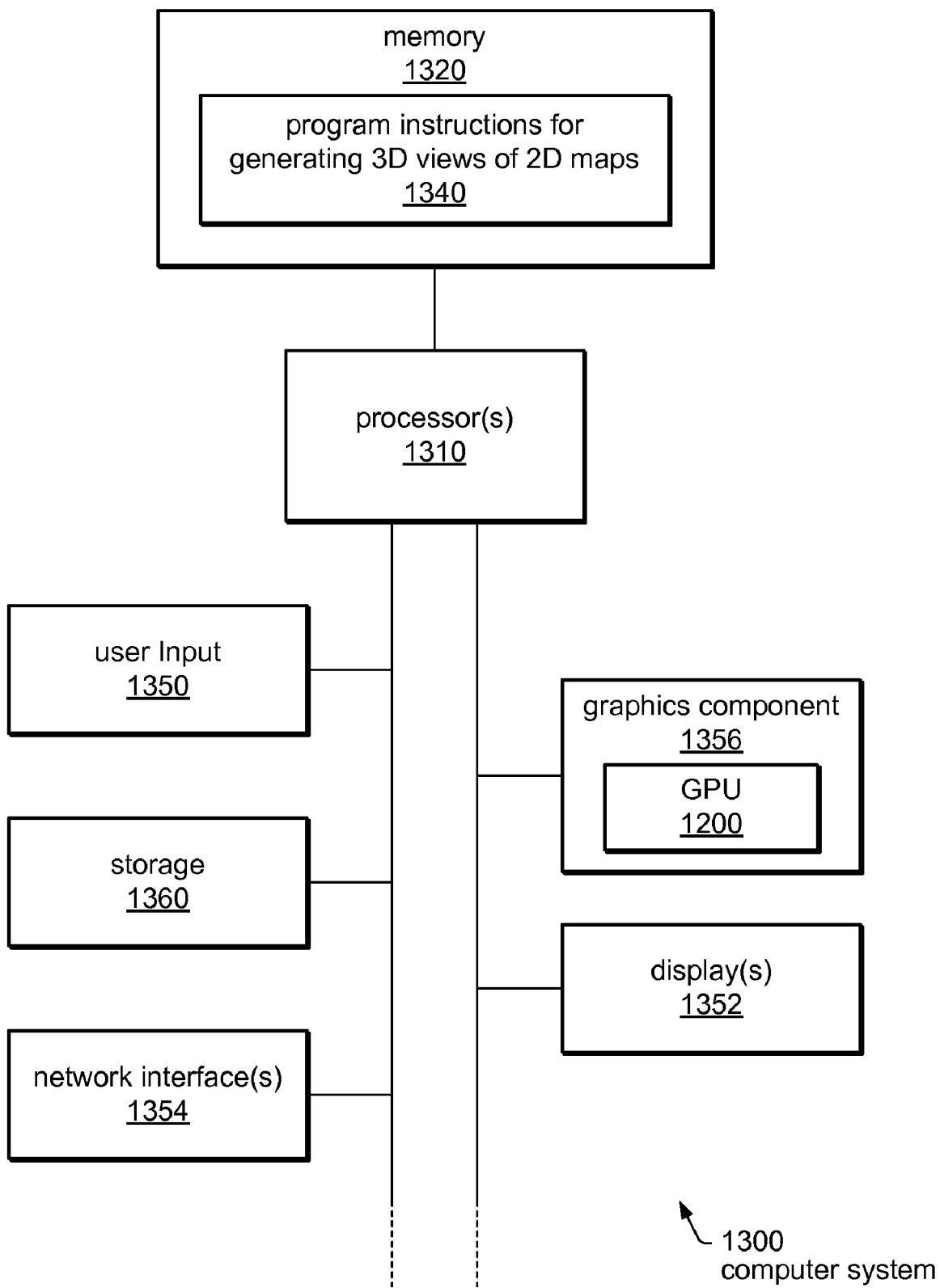
FIG. 11 is a block diagram illustrating constituent elements of a computer system that is configured to implement embodiments of the system and method for translating 2D maps into 3D views.

The methods described herein for translating 2D images (e.g., maps) included in input documents to 3D views may in some embodiments be implemented using modern graphics hardware, such as a graphics processing unit, or GPU. FIG. 10 is a block diagram illustrating one embodiment of a GPU 1200 configured for rendering such scenes. The GPU 1200 may comprise a dedicated graphics rendering device associated with a computer system. An example of a suitable computer system 1300 for use with a GPU is illustrated in FIG. 11. The GPU 1200 illustrated in FIG. 10 may include numerous specialized components configured to optimize the speed of rendering graphics output. For example, the GPU 1200 may include specialized components for rendering three-dimensional models, for applying textures to surfaces, etc. For the sake of illustration, however, only a limited selection of components is shown in the example GPU 1200 of FIG. 10. It is contemplated that GPU architectures other than the example architecture of FIG. 10 may be suitable for implementing the techniques described herein. The GPU 1200 may implement one or more application programmer interfaces (APIs) that permit programmers to invoke the functionality of the GPU. Suitable GPUs may be commercially available from vendors such as NVIDIA Corporation, ATI Technologies, and others.

The GPU 1200 may include a host interface 1260 configured to communicate with a data source 1280 (e.g., a communications bus and/or processor(s) 1310 of a host computer system 1300, or the host system itself). For example, the data source 1280 may provide input data 1285 (e.g., image data, COS entries, etc.) and/or executable program code to the GPU 1200. In some embodiments, the host interface 1260 may permit the movement of data in both directions between the GPU 1200 and the data source 1280. The GPU 1200 may also include a display interface 1270 for providing output data to a data target 1290. For example, the data target 1290 may comprise a display device 1352, and the GPU 1200 (along with other graphics components and/or interfaces 1356) may "drive" the display 1352 by providing graphics data at a particular rate from a screen buffer (e.g., the image buffer 1250).

In one embodiment, the GPU 1200 may include internal memory 1210. The GPU memory 1210, also referred to herein as "video memory" or "VRAM," may comprise random-access memory (RAM) which is accessible to other GPU components. As will be described in greater detail below, the GPU memory 1210 may be used in some embodiments to store various types of data and instructions such as input data, output data, intermediate data, program instructions for performing various tasks, etc. In one embodiment, the GPU 1200 may also be configured to access memory 1320 of a host computer system 1300 via the host interface 1260.

In one embodiment, program instructions 1340 may be stored in the memory 1320 of the host computer system 1300 and executed by the host computer system 1300 to generate output image 1295 (e.g., a 3D view of an imported 2D map) based on input data 1285. Input data 1285 may include data representing a 2D (i.e., flat) map, and may also include geospatial and/or non-geospatial information related to the map, as described herein. For example, input data 1285 may include image data included in an input document along with additional embedded information, and/or may include additional information imported from one or more additional files, databases, and/or libraries.

In one embodiment, the GPU 1200 may include GPU program code 1220 that is executable by the GPU 100 to perform aspects of the techniques discussed herein. For example, the geometric objects in the input 1285 may be rasterized to pixels during a rendering process including execution of the GPU program code 1220 on the GPU 1200. Elements of the GPU program code 1220 may be provided to the GPU 1200 by a host computer system (e.g., the data source 1280) and/or native to the GPU 1200. In one embodiment, the GPU program code 1220 may comprise one or more shaders, blending functions, or peeling functions (not shown). In generating the output image 1295, any of these functions, or other functions included in GPU program code 1220, may be executed at various points in the graphics pipeline.

The GPU memory 1200 may comprise one or more buffers, and each buffer may comprise a two-dimensional array of pixel data (e.g., color values) and/or pixel metadata (e.g., depth values, stencil values, etc.). Each buffer may comprise a two-dimensional array of pixel data (e.g., color values) and/or pixel metadata (e.g., depth values, stencil values, etc.). As illustrated in FIG. 10, for example, the GPU memory 1210 may comprise an image buffer 1250. The image buffer 1250 may store intermediate or final pixel values generated in the rendering process. In one embodiment, the image buffer 1250 may comprise a single-sampling buffer wherein each pixel in the buffer is represented by a single set of color and alpha values (e.g., one color value for a red channel, one color value for a green channel, one color value for a blue channel, and appropriate values for a one or more alpha channels). In another embodiment, the image buffer 1250 may comprise a multi-sampling buffer usable for automatic anti-aliasing.

As illustrated in FIG. 10, the GPU memory 1210 may comprise various other buffers such as an intensity buffer (not shown), an intermediate buffer 1265, a height map 1255, and an environment map 1260, each of which may store intermediate information during translation of a 2D map image to a 3D view. In one embodiment, the image buffer 1250 may be the same resolution as the target resolution of the data target 1290. The image buffer 1250 may comprise a screen buffer, which is provided directly to the data target 1290. In one embodiment, the image buffer 1250 and the height map 1255 may be the same resolution, and each location (i.e., a pixel) in the image buffer may correspond to a respective location in the height map 1255. Each value stored in the height map 1255 may indicate a relative height or distance of the corresponding pixel from a reference point.

The GPU 1200 may include various built-in functions to assist in the rendering of artwork. In one embodiment, the GPU 1200 may include a Z-test and/or a stencil test function (not shown). Functions such as the Z-test and stencil test may be enabled, disabled, and/or otherwise configured through invocation of appropriate functions in the GPU API and/or by operation of the anti-aliasing program code 1220.

Program code 1220 may include an image modeling function 1223 and a height-field renderer 1224. Program code 1220 may include a document-based 3D translator 1222, a fly tool 1225, and/or a measurement tool 1226, as described herein. In some embodiments, these functions may include program instructions executable by the GPU to implement the methods described herein for efficiently and correctly rendering a 3D view of a 2D map, as projected on the Earth, which may include height fields, texturing, and/or projected geospatial and/or non-geospatial information. These functions may also include program instructions executable by the GPU to implement various operations on a 3D view generated by the 3D translator, such as a fly-by or fly-through simulation and/or various measurement operations. In other embodiments, program instructions 1340 (shown in FIG. 11) may be used to implement the methods. In still other embodiments, the operations of a document application, including some of the graphics operations described herein for translating 2D maps to 3D views, may be divided between one or more CPUs and/or GPUs for execution. For example, some computations may be simpler on the CPU, while fewer instructions may be used for other operations if executed on the GPU. Similarly, a computation in the GPU and/or CPU may be more robust for particular calculations performed by a graphics application. Various embodiments may be chosen to match the capabilities of a particular GPU 1200 (e.g., the GPU 1200 may lack a 3D translator 1222, fly tool 1225, measurement tool 1226, or other component illustrated in FIG. 10).

FIG. 11 is a block diagram illustrating constituent elements of a computer system 1300 that is configured to implement embodiments of the system and method for generating 3D views of 2D maps, as described herein. The computer system 1300 may include one or more processors 1310 implemented using any desired architecture or chip set, such as the SPARC™ architecture, an x86-compatible architecture from Intel Corporation or Advanced Micro Devices, or an other architecture or chipset capable of processing data. Any desired operating system(s) may be run on the computer system 1300, such as various versions of Unix, Linux, Windows® from Microsoft Corporation, MacOS® from Apple Inc., or any other operating system that enables the operation of software on a hardware platform. The processor(s) 1310 may be coupled to one or more of the other illustrated components, such as a memory 1320, by at least one communications bus.

In one embodiment, a specialized graphics card or other graphics component 1356 may be coupled to the processor(s) 1310. The graphics component 1356 may include a GPU such as the GPU 1200 illustrated in FIG. 10. Additionally, the computer system 1300 may include one or more imaging devices 1352. The one or more imaging devices 1352 may include various types of raster-based imaging devices such as monitors and printers. In one embodiment, one or more display devices 1352 may be coupled to the graphics component 1356 for display of data provided by the graphics component 1356.

In one embodiment, program instructions 1340 that may be executable by the processor(s) 1310 to implement aspects of the techniques described herein may be partly or fully resident within the memory 1320 at the computer system 1300 at any point in time. In addition, various input files, output files, databases, and/or libraries, as described herein, may be partly or fully resident within the memory 1320 at the computer system 1300 at any point in time. The memory 1320 may be implemented using any appropriate medium such as any of various types of ROM or RAM (e.g., DRAM, SDRAM, RDRAM, SRAM, etc.), or combinations thereof. Program instructions, input files, output files, databases, and/or libraries used to implement the techniques described herein may also be stored on a storage device 1360 accessible from the processor(s) 1310. Any of a variety of storage devices 1360 may be used to store the program instructions 1340, input files, output files, databases, and/or libraries in different embodiments, including any desired type of persistent and/or volatile storage devices, such as individual disks, disk arrays, optical devices (e.g., CD-ROMs, CD-RW drives, DVD-ROMs, DVD-RW drives), flash memory devices, various types of RAM, holographic storage, etc. The storage 1360 may be coupled to the processor(s) 1310 through one or more storage or I/O interfaces. In some embodiments, the program instructions 1340, input files, output files, databases, and/or libraries may be provided to the computer system 1300 via any suitable computer-readable storage medium including the memory 1320 and storage devices 1360 described above.

The computer system 1300 may also include one or more additional I/O interfaces, such as interfaces for one or more user input devices 1350. In addition, the computer system 1300 may include one or more network interfaces 1354 providing access to a network. It should be noted that one or more components of the computer system 1300 may be located remotely and accessed via the network. The program instructions, input files, output files, databases, and/or libraries may be implemented in various embodiments using any desired file formats, programming language, scripting languages, or combination of programming languages and/or scripting languages, e.g., C, C++, C#, Java™, Perl, etc. It will be apparent to those having ordinary skill in the art that computer system 1300 can also include numerous elements not shown in FIG. 11, as illustrated by the ellipsis shown.

Although the embodiments above have been described in detail, numerous variations and modifications will become apparent to those skilled in the art once the above disclosure is fully appreciated. It is intended that the following claims be interpreted to embrace all such variations and modifications.

What is claimed is:

1. A computer-implemented method, comprising:
receiving input data comprising two-dimensional image data that represents one or more two-dimensional image elements;
determining whether the image data that represents the one or more two-dimensional image elements is associated with geospatial data; and
in response to determining that the image data that represents the one or more two-dimensional image elements is associated with geospatial data:
obtaining the geospatial data that is associated with the one or more two-dimensional image elements;
rendering a three-dimensional view comprising the one or more two-dimensional image elements, wherein said rendering is dependent, at least in part, on the geospatial data that is associated with the one or more two-dimensional image elements, and wherein said rendering comprises:
determining, based at least in part on the geospatial data, a three-dimensional surface on which to project the one or more two-dimensional image elements, wherein a shape of or a location on the three-dimensional surface on which to project the one or more two-dimensional image elements is determined based at least in part on the geospatial data; and
projecting the one or more two-dimensional image elements on the determined three-dimensional surface; and
generating an output document comprising data representing the three-dimensional view.

2. The method of claim 1, wherein the input data comprises image data representing a map.

3. The method of claim 1, wherein said rendering a three-dimensional view comprises translating the two-dimensional image data to three-dimensional data.

4. The method of claim 1, wherein at least one of the received input data or the associated geospatial data is provided in an input document.

5. The method of claim 1, wherein said rendering a three-dimensional view comprises projecting the one or more two-dimensional image elements as a texture on the determined three-dimensional surface.

6. The method of claim 1, further comprising, operating on the three-dimensional view using one or more functions of a document authoring application.

7. The method of claim 6, wherein said operating on the three-dimensional view comprises one or more of: operating on the three-dimensional view using a measurement function of the document authoring application, modifying a viewpoint of the three-dimensional view, modifying an appearance of one of the one or more two-dimensional image elements, or modifying visibility of one of the one or more two-dimensional image elements.

8. The method of claim 1, wherein the input data further comprises three-dimensional image data.

9. The method of claim 1, wherein the output document comprises a document in a portable document format.

10. The method of claim 1, wherein at least one of the input data or the data representing the three-dimensional view comprises data formatted according to one or more standard image formats.

11. The method of claim 1, wherein the geospatial data comprises one or more of: location information relative to a celestial body, extent information relative to a celestial body, or projection information.

12. The method of claim 1, wherein said rendering a three-dimensional view comprises depicting the geospatial information in the three-dimensional view using one or more of: color, texture, text, or deformation of an appearance of the determined three-dimensional surface.

13. The method of claim 1, further comprising:
determining if any non-geospatial information is associated with the input data; and
in response to determining that non-geospatial information is associated with the input data, modifying the three-dimensional view to include the non-geospatial information.

14. The method of claim 13, wherein said modifying the three-dimensional view to include the non-geospatial information comprises one or more of: projecting the non-geospatial information on the determined three-dimensional surface, displaying the non-geospatial information as text, modifying a color of the three-dimensional view, modifying a texture of the three-dimensional view, modifying height information associated with the three-dimensional view, or adding a markup language statement to the data representing the three-dimensional view.

15. The method of claim 13, wherein the non-geospatial information comprises one or more of: height information, text, numerical information, statistical information, color, texture, or a markup language statement.

16. The method of claim 1, further comprising:
receiving the output document as an input document;
rendering the three-dimensional view represented by the data in the output document;
modifying the rendered three-dimensional view, wherein said modifying the rendered three-dimensional view comprises one or more of: adding geospatial information to the rendered three-dimensional view, adding non-geospatial information to the rendered three-dimensional view, or adding a markup language statement to the rendered three-dimensional view; and
generating a second output document comprising data representing the modified rendered three-dimensional view.

17. The method of claim 1, further comprising:
receiving the output document as an input document; and
rendering a two-dimensional image comprising the one or more two-dimensional image elements using the data in the output document representing the three-dimensional view.

18. The method of claim 1, further comprising simulating a fly-by or fly-through of the three-dimensional view using an operation invoked within a document authoring application.

19. The method of claim 18,
wherein said simulating comprises applying one or more constraints to the fly-by or fly-through;
wherein the one or more constraints are selected for application to the fly-by or fly-through dependent, at least in part, on the input data; and
wherein the one or more constraints define a limitation on motion or an enhanced freedom of movement for the fly-by or fly-through simulation.

20. The method of claim 1, wherein the output document comprises a replacement for an input document from which the input data was received.

21. The method of claim 1, wherein the geospatial data is obtained from a library, from a database, from a data store, from an input file other than an input file comprising the input data, or from user input.

22. The method of claim 1,
wherein the input data represents one or more two-dimensional image elements within an input document; and
wherein said generating an output document comprises locating the three-dimensional view within the output document at a location corresponding to a location of at least one of the one or more two-dimensional image elements within the input document.

23. The method of claim 1, further comprising:
determining a visual priority of the three-dimensional view dependent, at least in part, on object data derived from a subset of the input data, the subset of the input data representing a subset of the one or more two-dimensional image elements;
wherein said rendering the three-dimensional view is dependent, at least in part, on the determined visual priority.

24. A non-transitory computer-readable storage medium, storing program instructions, wherein the program instructions are computer-executable to implement a three-dimensional translator configured to:
receive an input document comprising two-dimensional image data representing a two-dimensional map;
determine whether the input document contains geospatial data that is associated with the two-dimensional map; and
in response to determining that the input document contains geospatial data that is associated with the two-dimensional map:
extract the geospatial data that is associated with the two-dimensional map from the input document;
render a three-dimensional image comprising the two-dimensional map, wherein said rendering is dependent, at least in part, on the extracted geospatial data that is associated with the two-dimensional map, and wherein said rendering comprises:
determining, based at least in part on the geospatial data, a three-dimensional surface on which to project the two-dimensional map, wherein a shape of or a location on the three-dimensional surface on which to project the two-dimensional map is determined based at least in part on the geospatial data; and
projecting the two-dimensional map on the determined three-dimensional surface; and
generate an output document comprising image data representing the three-dimensional image.

25. The storage medium of claim 24, wherein said rendering a three-dimensional image comprises translating the two-dimensional image data to three-dimensional image data.

26. The storage medium of claim 24, wherein said rendering a three-dimensional image comprises projecting the image data as a texture on the determined three-dimensional surface.

27. The storage medium of claim 24, wherein the three-dimensional translator is further configured to operate on the three-dimensional image using one or more functions of a document authoring application.

28. The storage medium of claim 24, wherein the output document comprises a document in a portable document format.

29. The storage medium of claim 24, wherein the geospatial data comprises one or more of: location information relative to a celestial body, extent information relative to a celestial body, or projection information.

30. The storage medium of claim 24, wherein said rendering a three-dimensional image comprises depicting the geospatial information in the three-dimensional image using one or more of: color, texture, text, or deformation of an appearance of the determined three-dimensional surface.

31. The storage medium of claim 24, wherein the three-dimensional translator is further configured to:
  determine if any non-geospatial information is associated with the image data; and
  in response to determining that non-geospatial information is associated with the image data, modify the three-dimensional image to include the non-geospatial information;
  wherein said modifying the three-dimensional image to include the non-geospatial information comprises one or more of: projecting the non-geospatial information on the determined three-dimensional surface, displaying the non-geospatial information as text, modifying a color of the three-dimensional image, modifying a texture of the three-dimensional image, modifying height information associated with the three-dimensional image, or adding a markup language statement to the image data representing the three-dimensional image.

32. The storage medium of claim 31, wherein the non-geospatial information comprises one or more of: height information, text, numerical information, statistical information, color, texture, or a markup language statement.

33. A system, comprising:
  one or more processors; and
  a memory coupled to the one or more processors;
  wherein the memory is configured to store program instructions executable by the one or more processors to implement a three-dimensional translator configured to:
    receive an input document comprising two-dimensional image data representing a two-dimensional map;
    determine whether the input document contains geospatial data that is associated with the two-dimensional map; and
    in response to determining that the input document contains geospatial data that is associated with the two-dimensional map:
      extract the geospatial data that is associated with the two-dimensional map from the input document;
      render a three-dimensional image comprising the two-dimensional map, wherein said rendering is dependent, at least in part, on the extracted geospatial data that is associated with the two-dimensional map, and wherein said rendering comprises:
        determining, based at least in part on the geospatial data, a three-dimensional surface on which to project the two-dimensional map, wherein a shape of or a location on the three-dimensional surface on which to project the two-dimensional map is determined based at least in part on the geospatial data; and
        projecting the two-dimensional map on the determined three-dimensional surface; and
      generate an output document comprising image data representing the three-dimensional image.

34. The system of claim 33, wherein said rendering a three-dimensional image comprises translating the two-dimensional image data to three-dimensional image data.

35. The system of claim 33, wherein said rendering a three-dimensional image comprises projecting the image data as a texture on the determined three-dimensional surface.

36. The system of claim 33, wherein the three-dimensional translator is further configured to operate on the three-dimensional image using one or more functions of a document authoring application.

37. The system of claim 33, wherein the output document comprises a document in a portable document format.

38. The system of claim 33, wherein the geospatial data comprises one or more of: location information relative to a celestial body, extent information relative to a celestial body, or projection information.

39. The system of claim 33, wherein said rendering a three-dimensional image comprises depicting the geospatial information in the three-dimensional image using one or more of color, texture, text, or deformation of an appearance of the determined three-dimensional surface.

40. The system of claim 33, wherein the three-dimensional translator is further configured to:
  determine if any non-geospatial information is associated with the image data; and
  in response to determining that non-geospatial information is associated with the image data, modify the three-dimensional image to include the non-geospatial information;
  wherein the non-geospatial information comprises one or more of: height information, text, numerical information, statistical information, color, texture, or a markup language statement.

41. The system of claim 40, wherein said modifying the three-dimensional image to include the non-geospatial information comprises one or more of: projecting the non-geospatial information on the determined three-dimensional surface, displaying the non-geospatial information as text, modifying a color of the three-dimensional image, modifying a texture of the three-dimensional image, modifying height information associated with the three-dimensional image, or adding a markup language statement to the image data representing the three-dimensional image.

42. The system of claim 33, wherein in response to determining that the input document does not contain geospatial data, the three-dimensional translator is configured to:
  render a three-dimensional image comprising the two-dimensional map projected on a three-dimensional surface, wherein said rendering is dependent, at least in part, on geospatial data provided through a user interface of the three-dimensional translator or on default geospatial data; and
  generate an output document comprising image data representing the three-dimensional image.

43. The system of claim 33, wherein the one or more processors comprise one or more of a graphics processing unit or a general purpose central processing unit.

* * * * *